US010287399B2

(12) United States Patent
Peeters et al.

(10) Patent No.: US 10,287,399 B2
(45) Date of Patent: May 14, 2019

(54) CURABLE COMPOSITION AND CURED ARTICLE OBTAINED THEREFROM

(71) Applicant: KANEKA CORPORATION, Osaka (JP)

(72) Inventors: Luc Peeters, Westerlo-Oevel (BE); Stan Claes, Westerlo-Oevel (BE); Ayako Yano, Takasago (JP); Akinori Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/543,517

(22) PCT Filed: Jan. 15, 2016

(86) PCT No.: PCT/JP2016/051071
§ 371 (c)(1),
(2) Date: Jul. 13, 2017

(87) PCT Pub. No.: WO2016/114376
PCT Pub. Date: Jul. 21, 2016

(65) Prior Publication Data
US 2018/0002491 A1  Jan. 4, 2018

(30) Foreign Application Priority Data

Jan. 16, 2015 (JP) ................. 2015-007154
Apr. 15, 2015 (JP) ................. 2015-083548

(51) Int. Cl.
C08G 77/46 (2006.01)
C08K 5/06 (2006.01)
C08K 5/29 (2006.01)
C08K 5/544 (2006.01)
C08G 77/48 (2006.01)
C09K 3/10 (2006.01)
C08L 71/02 (2006.01)
C08L 101/10 (2006.01)

(52) U.S. Cl.
CPC ............ C08G 77/46 (2013.01); C08G 77/48 (2013.01); C08K 5/06 (2013.01); C08K 5/29 (2013.01); C08K 5/544 (2013.01); C08L 71/02 (2013.01); C08L 101/10 (2013.01); C09K 3/10 (2013.01); C09K 3/1018 (2013.01)

(58) Field of Classification Search
None
See application file for complete search history.

(56) References Cited

U.S. PATENT DOCUMENTS

| | | | | |
|---|---|---|---|---|
| 4,374,237 A * | 2/1983 | Berger | ........... | C08G 18/10 528/28 |
| 6,414,077 B1 * | 7/2002 | Barron | ........... | C08F 2/38 524/588 |
| 6,803,412 B2 * | 10/2004 | Nguyen-Misra | ....... | C08G 18/10 525/102 |
| 7,482,420 B2 * | 1/2009 | Porsch | ........... | C08G 18/10 528/28 |
| 7,789,990 B2 * | 9/2010 | Zhu | ........... | C09J 5/00 156/108 |
| 8,580,361 B2 * | 11/2013 | Landon | ........... | B82Y 30/00 428/34 |
| 9,714,316 B2 * | 7/2017 | Kramer | ........... | C08G 18/837 |
| 2004/0181007 A1 * | 9/2004 | Acevedo | ........... | C08K 3/01 524/589 |
| 2004/0204539 A1 | 10/2004 | Schindler et al. | | |
| 2008/0245476 A1 * | 10/2008 | Loth | ........... | C09D 201/10 156/329 |
| 2009/0131591 A1 * | 5/2009 | Schindler | ........... | C08G 65/336 525/105 |
| 2009/0186993 A1 | 7/2009 | Noro et al. | | |
| 2010/0041810 A1 * | 2/2010 | Wakabayashi | ........... | C08K 3/16 524/425 |
| 2010/0055474 A1 * | 3/2010 | Bachon | ........... | C08G 18/4825 428/429 |
| 2010/0152373 A1 | 6/2010 | Wakabayashi et al. | | |
| 2011/0207886 A1 * | 8/2011 | Wakabayashi | ........... | C07F 7/126 525/102 |
| 2012/0202919 A1 * | 8/2012 | Prasse | ........... | C08K 9/04 523/200 |
| 2013/0217828 A1 | 8/2013 | Miyafuji et al. | | |
| 2014/0213718 A1 * | 7/2014 | Kulkarni | ........... | C08G 18/6216 524/506 |

(Continued)

FOREIGN PATENT DOCUMENTS

EP   1985666 A1   10/2008
EP   2 080 777 A1   7/2009
(Continued)

OTHER PUBLICATIONS

International Search Report dated Mar. 29, 2016 for PCT/JP2016/051071.
(Continued)

Primary Examiner — Robert S Loewe
(74) Attorney, Agent, or Firm — Hauptman Ham, LLP

(57) ABSTRACT

Provided is a curable composition which is free of organotin compounds to be environmentally friendly and whose cured product shows high elongation and high elastic recovery to be suitable particularly as a sealant. The present invention relates to a curable composition containing a reactive silyl group-containing organic polymer (A) which has a highly active reactive silyl group at a molecular chain end, and a compound (B) having 2 to 10 ethyloxy groups in its molecule but having no amino group in its molecule, the compound (B) being a C1-C20 saturated hydrocarbon having one alkoxysilyl group, a C1-C20 hydrocarbon having two or more alkoxysilyl groups, or a C1-C20 polycarboxylic acid ester.

19 Claims, No Drawings

(56) References Cited

U.S. PATENT DOCUMENTS

2015/0133622 A1* 5/2015 Harumashi .......... C08G 65/331 528/32

FOREIGN PATENT DOCUMENTS

| EP | 2177571 A1 | 4/2010 |
|---|---|---|
| GB | 2466486 A | 6/2010 |
| JP | 52-073998 A | 6/1977 |
| JP | S52-73998 A | 6/1977 |
| JP | 63-006041 A | 1/1988 |
| JP | S63-6041 A | 1/1988 |
| JP | 64-075567 A | 3/1989 |
| JP | S64-75567 A | 3/1989 |
| JP | 2-103264 | 4/1990 |
| JP | H2-103264 A | 4/1990 |
| JP | 3-505749 A | 12/1991 |
| JP | H3-505749 A | 12/1991 |
| JP | 10-148701 A | 6/1998 |
| JP | H10-148701 A | 6/1998 |
| JP | 11-116832 A | 4/1999 |
| JP | H11-116832 A | 4/1999 |
| JP | 2000-512662 A | 9/2000 |
| JP | 2003-503564 A | 1/2003 |
| JP | 2005-501146 A | 1/2005 |
| JP | 2005-248175 A | 9/2005 |
| JP | WO2008/053875 A1 | 5/2008 |
| JP | WO2008/099585 A1 | 8/2008 |
| JP | WO2012/020560 A1 | 2/2012 |
| JP | 2012-525480 A | 10/2012 |
| JP | 2013-502503 A | 1/2013 |
| WO | 90/07542 A1 | 7/1990 |
| WO | 97/12940 A1 | 4/1997 |
| WO | 2007/094276 A1 | 8/2007 |
| WO | 2008/053875 A1 | 5/2008 |
| WO | 2008/099858 A1 | 8/2008 |
| WO | 2010/126937 A1 | 11/2010 |
| WO | 2012/020560 A1 | 2/2012 |

OTHER PUBLICATIONS

International Preliminary Report on Patentability dated Jul. 18, 2017 in connection with the counterpart International Patent Application No. PCT/JP2016/051071.

* cited by examiner

CURABLE COMPOSITION AND CURED ARTICLE OBTAINED THEREFROM

CROSS REFERENCE TO RELATED APPLICATION

This application claims the priority of Japanese Patent Application No. 2015-007154, filed on Jan. 16, 2015, and Japanese Patent Application No. 2015-083548 filed on Apr. 15, 2015, in the JPO (Japanese Patent Office). Further, this application is the National Phase Application of International Application No. PCT/JP2016/051071, filed on Jan. 15, 2016, which designates the U.S. and was published in Japan. Three of the priority documents are hereby incorporated by reference in their entireties.

TECHNICAL FIELD

The present invention relates to an organic polymer containing a silicon-containing group (silyl group) that contains a hydroxy or hydrolyzable group bonded to a silicon atom and can be crosslinked by forming a siloxane bond (hereinafter also referred to as "reactive silyl group"). The present invention also relates to a curable composition containing the organic polymer.

BACKGROUND ART

It is known that organic polymers having at least one reactive silyl group in the molecule, by nature, are crosslinked by siloxane bond formation, which involves the hydrolysis and other reactions of the silyl group due to factors such as moisture even at room temperature, thereby forming rubbery cured products. Such reactive silyl group-containing organic polymers whose backbone is a polyoxyalkylene polymer or a polyisobutylene polymer have been produced on an industrial scale and widely used in applications such as sealants, adhesives, and paints (Patent Literatures 1 and 2). When reactive silyl group-containing organic polymers are used in curable compositions for sealants, adhesives, paints, or other similar applications, they are required to have various properties such as curability and adhesion as well as mechanical properties of the cured products.

Curable compositions containing reactive silyl group-containing organic polymers are usually used in combination with condensation catalysts such as organotin compounds having a carbon-tin bond, typically, dibutyltin bis(acetylacetonate) or dibutyltin dilaurate. Recently, however, the toxicity of organotin compounds has been pointed out, and thus suggestions have been made for using as condensation catalysts other than organotin compounds catalyst systems such as carboxylic acid tin salts or other carboxylic acid metal salts, combinations of carboxylic acids and amine compounds, or amine compounds. However, the use of even metals other than tin can be undesirable depending on the application, and the combined use of carboxylic acids and amine compounds has a problem in that it is less likely to result in high cure rate. Among the above catalyst systems, highly basic amine compounds have been found to be excellent in the balance of physical properties such as curability and adhesion (Patent Literatures 3 and 4).

Meanwhile, it has been found that when an amine compound is used as a curing catalyst, a polymer having a specific chain end structure can be used to prepare a curable composition that exhibits a high cure rate (Patent Literatures 5 and 6). However, cured products of curable compositions containing polymers as disclosed in Patent Literatures 5 and 6 tend to show low elastic recovery and thus require some improvement when they are used as construction sealants where significant movement of the joints occurs.

CITATION LIST

Patent Literature

Patent Literature 1: JP-A S52-73998
Patent Literature 2: JP-A S63-6041
Patent Literature 3: JP-A 2005-248175
Patent Literature 4: WO2007/094276
Patent Literature 5: JP-T 2005-501146
Patent Literature 6: WO2008/053875

SUMMARY OF INVENTION

Technical Problem

The present invention solves the problem that cured products show low elongation and low elastic recovery when they are formed from a combination of an amine curing catalyst and a reactive silyl group-containing organic polymer having a specific structure as suggested in Patent Literatures 5 and 6. Specifically, an object of the present invention is to provide a curable composition which uses an amine compound as a condensation catalyst, without using organotin or other metal catalysts, to be environmentally friendly, and which can be cured at a high cure rate to form a cured product that shows high elongation and high elastic recovery to be usable as a construction sealant that can be suitably used for joints called working joints where significant movement occurs.

Solution to Problem

As a result of extensive studies to solve the problem, the present inventors have found that excellent elongation properties and high elastic recovery can be simultaneously achieved by combining a reactive silyl group-containing organic polymer having a specific structure and a specific compound. Based on this finding, the present invention has been completed.

Specifically, the present invention relates to a curable composition, containing 100 parts by weight of a reactive silyl group-containing organic polymer (A), and 0.1 to 20 parts by weight of a compound (B) having 2 to 10 ethyloxy groups and no amino group, the organic polymer (A) having at a molecular chain end a reactive silyl group represented by formula (1):

$$-W-CH_2-SiR^1_a R^2_b X_c \qquad (1)$$

wherein $R^1$ is a C1-C20 hydrocarbon group in which at least one hydrogen atom on carbon atoms at positions 1 to 3 is replaced with a group selected from the group consisting of a halogen atom, $-OR^3$, $-NR^4R^5$, $-N=R^6$, $-SR^7$, a C1-C20 perfluoroalkyl group, and a cyano group, wherein $R^3$, $R^4$, $R^5$, and $R^7$ are each a hydrogen atom or a C1-C20 monovalent substituted or unsubstituted hydrocarbon group, and $R^6$ is a C1-C20 divalent substituted or unsubstituted hydrocarbon group; $R^2$ is a C1-C20 hydrocarbon group, a C6-C20 aryl group, a C7-C20 aralkyl group, or a triorganosiloxy group represented by $R^0_3SiO-$ wherein the three $R^0$'s are C1-C20 hydrocarbon groups and may be the same as or different from each other; X is a hydroxy group or a hydrolyzable group; W is a linking group selected from the group consisting of —O—R$^8$—, —O—CO—N (R$^9$)—, —N(R$^9$)—CO—O—, —N(R$^9$)—CO—N (R$^9$)—, —S—CO—NH—, and —NH—CO—S—, wherein R$^8$ is a C1-C8 divalent hydrocarbon group, and R$^9$ is hydrogen, an optionally halogen-substituted cyclic, linear, or branched C1-C18 alkyl or alkenyl group, or a C6-C18 aryl group; when W is —O—R$^8$—, a is 1 or 2, b is 0 or 1, c is 1 or 2, and a+b+c =3; when W is not —O—R$^8$—, a is 0, 1, or 2, b is 0, 1, or 2, c is 1, 2, or 3, and a+b+c=3; and each occurrence of R$^1$, R$^2$, X, W, or R$^9$ may be the same or different, the compound (B) being a C1-C20 saturated hydrocarbon having one alkoxysilyl group, a C1-C20 hydrocarbon having two or more alkoxysilyl groups, or a C1-C20 polycarboxylic acid ester.

Preferably, the compound (B) is free of reactive functional groups other than ethoxy groups.

Preferably, R$^1$ in formula (1) is an organic group represented by formula (2):

(2)

wherein Y is a group selected from the group consisting of a halogen atom, —OR$^3$, —NR$^4$R$^5$, —N=R$^6$, —SR$^7$, a C1-C20 perfluoroalkyl group, and a cyano group, wherein R$^3$, R$^4$, R$^5$, and R$^7$ are each a hydrogen atom or a C1-C20 monovalent substituted or unsubstituted hydrocarbon group, and R$^6$ is a C1-C20 divalent substituted or unsubstituted hydrocarbon group; R$^{10}$ is a hydrogen atom or a C1-C19 alkyl group; e is 1, 2, or 3; and each occurrence of Y or R$^{10}$ may be the same or different.

Preferably, Y in formula (2) is an alkoxy group.

Preferably, Y in formula (2) is a methoxy group, an ethoxy group, or a phenoxy group.

Preferably, the organic group represented by formula (2) is a methoxymethyl group or an ethoxymethyl group.

Preferably, the organic group represented by formula (1) is —O—CO—NH—CH$_2$—SiR$^1{}_a$R$^2{}_b$X$_c$ wherein R$^1$, R$^2$, a, b, and c are as defined above.

Preferably, X in formula (1) is a dimethoxy group.

Preferably, the organic polymer (A) has a backbone that is a polyoxyalkylene polymer.

Preferably, the organic polymer (A) has a backbone that is a polyoxypropylene polymer.

Preferably, there are no more than 500 ppm of any organotin compound in the composition.

Preferably, the composition further contains an amidine compound as a silanol condensation catalyst in an amount of 0.001 to 20 parts by weight per 100 parts by weight of the organic polymer (A).

Preferably, the compound (B) is 1,2-bis(triethoxysilyl) ethane, 1,3-bis(triethoxysilyl)propane, propyltriethoxysilane, n-octyltriethoxysilane, diethyl succinate, diethyl adipate, diethyl sebacate, or diethyl phthalate.

Preferably, the compound (B) has at least one silyl group in its molecule.

Preferably, the composition further contains an amino group-containing silane coupling agent in an amount of 0.1 to 3.8 parts by weight per 100 parts by weight of the organic polymer (A).

The present invention also relates to a one-pack curable composition, containing, as a component, the curable composition, and to a sealant, containing, as a component, the curable composition.

The present invention also relates to a cured product of the curable composition, which preferably has an elongation at break of 380% or higher and an elastic recovery of 65% or higher.

ADVANTAGEOUS EFFECTS OF INVENTION

The curable composition of the present invention contains a reactive silyl group-containing organic polymer (A) having a specific structure and a compound (B) having 2 to 10 specific ethyloxy groups but having no amino group in the molecule. Thus, a cured product of the curable composition shows excellent elongation properties and high elastic recovery.

DESCRIPTION OF EMBODIMENTS

The present invention is described in detail below.

The reactive silyl group-containing organic polymer (A) used in the present invention is not particularly limited as long as it is an organic polymer containing a reactive silyl group represented by the following formula (1):

(1)

wherein R$^1$ is a C1-C20, preferably C1-C6 hydrocarbon group in which at least one hydrogen atom on the carbon atoms at positions 1 to 3 is replaced with an electron-withdrawing group; R$^2$ is a C1-C20, preferably C1-C6 hydrocarbon group, a C6-C20, preferably C6-C10 aryl group, a C7-C20, preferably C7-C10 aralkyl group, or a triorganosiloxy group represented by R$^0{}_3$SiO— wherein the three R$^0$'s are C1-C20, preferably C1-C6 hydrocarbon groups and may be the same as or different from each other; X is a hydroxy group or a hydrolyzable group; W is a linking group selected from —O—R$^8$—, —O—CO—N (R$^9$)—, —N(R$^9$)—CO—O—, —N(R$^9$)—CO—N(R$^9$)—, —S—CO—NH—, or —NH—CO—S—, wherein R$^8$ is a C1-C8, preferably C1-C4, divalent hydrocarbon group, and R$^9$ is hydrogen, an optionally halogen-substituted cyclic, linear, or branched C1-C18, preferably C1-C6 alkyl or alkenyl group, or a C6-C18, preferably C6-C10 aryl group; when W is —O—R$^8$—, a is 1 or 2, b is 0 or 1, c is 1 or 2, and a+b+c=3; when W is not —O—R$^8$—, a is 0, 1, or 2, b is 0, 1, or 2, c is 1, 2, or 3, and a+b+c=3; and each occurrence of R$^1$, R$^2$, X, W, or R$^9$ may be the same or different.

(Reactive silyl group of formula (1))

(I) When the linking group W in formula (1) is —O—R$^8$—:

What is essential is a silyl group in which the substituents bonded to the silicon atom in formula (1) include a hydrolyzable or hydroxy group and a hydrocarbon group in which at least one hydrogen atom on the carbon atoms at positions 1 to 3 is replaced with a halogen atom, —OR$^3$, —NR$^4$R$^5$, —N=R$^6$, —SR$^7$ (R$^3$, R$^4$, R$^5$, and R$^7$ are each a hydrogen atom or a C1-C20, preferably C1-C6, substituted or unsubstituted hydrocarbon group, and R$^6$ is a C1-C20, preferably C1-C6, divalent substituted or unsubstituted hydrocarbon group), a C1-C20, preferably C1-C6 perfluoroalkyl group, or a cyano group (hereinafter referred to as "heteroatom-containing reactive silyl group"). Owing to the presence of the heteroatom-containing reactive silyl group, the organic polymer (A) has rapid curability as compared to other organic polymers having reactive silyl groups containing unsubstituted hydrocarbon groups such as a methyl group (e.g., a dimethoxymethylsilyl group).

Further, R$^1$ in formula (1) is preferably a substituent represented by formula (2) below to provide higher curability:

(2)

wherein Y is a group selected from the group consisting of a halogen atom, —OR$^3$, —NR$^4$R$^5$, —N=R$^6$, —SR$^7$ (R$^3$, R$^4$, R$^5$, and R$^7$ are each a hydrogen atom or a C1-C20, preferably C1-C6, substituted or unsubstituted hydrocarbon group, and $R^6$ is a C1-C20, preferably C1-C6, divalent substituted or unsubstituted hydrocarbon group), a C1-C20, preferably C1-C6 perfluoroalkyl group, and a cyano group; $R^{10}$ is a hydrogen atom or a C1-C19, preferably C1-C6 alkyl group; e is 1, 2, or 3; and each occurrence of $R^{10}$ or Y may be the same or different.

The substituent of formula (2) is an example of the hydrocarbon group of $R^1$ in formula (1) which has a heteroatom at position 1.

Examples of Y in formula (2) include, but not limited to, halogen atoms; oxygen-containing substituents such as alkoxy and acyloxy groups; nitrogen-containing substituents such as amino, alkylamino, and ureido groups; acyl, alkoxycarbonyl, nitro, cyano, sulfonyl, and perfluoroalkyl groups, and electron-withdrawing aryl groups. Among these, alkoxy groups are preferred because they are environmentally desirable non-halogen groups and have high reactivity. More preferred are methoxy, ethoxy, and phenoxy groups.

More specific examples include halogen atoms such as fluorine, chlorine, bromine, and iodine atoms; alkoxy groups such as methoxy, ethoxy, 1-propoxy, 2-propoxy, 1-butoxy, 2-butoxy, tert-butyloxy, octoxy, lauryloxy, phenoxy, and benzyloxy groups; acyloxy groups such as acetoxy, propanoyloxy, and benzoyloxy groups; an amino group and a substituted amino groups such as methylamino, dimethylamino, ethylamino, diethylamino, propylamino, dipropylamino, and diphenylamino groups; groups having a urethane bond or a urea bond such as ureido and carbamate groups; acyl groups such as acetyl, propanoyl, octanoyl, lauroyl, and benzoyl groups; alkoxycarbonyl groups such as methoxycarbonyl and tert-butyloxycarbonyl groups; nitro, cyano, and isocyanato groups, sulfonyl groups such as methylsulfonyl and toluenesulfonyl groups; perfluoroalkyl groups such as trifluoromethyl, pentafluoroethyl, perfluoropropyl, perfluorohexyl, and perfluorooctyl groups; and electron-withdrawing aryl groups such as difluorophenyl and pentafluorophenyl groups. Among these, halogen atoms, alkoxy groups, substituted or unsubstituted amino groups, and trifluoromethyl group are preferred because polymers having high curability can be obtained. More preferred are halogen atoms, alkoxy groups, and substituted or unsubstituted amino groups, with halogen atoms or substituted or unsubstituted amino groups being still more preferred. In particular, a chlorine atom or a methoxy group is preferred because they provide higher curability in the presence of an amine compound as a curing catalyst. Dialkylamino groups are also preferred because they provide higher curability in the presence of a curing catalyst such as a carboxylic acid. Of the aforementioned groups, alkoxy groups are most preferred substituents. In particular, a methoxymethyl group or an ethoxymethyl group is preferred because they are halogen-free.

$R^1$ in formula (1) is a C1-C20 hydrocarbon group in which at least one hydrogen atom on the carbon atoms at positions 1 to 3 is replaced with an electron-withdrawing group such as a halogen atom. Examples include fluoromethyl, difluoromethyl, trifluoromethyl, 3,3,3-trifluoropropyl, chloromethyl, dichloromethyl, 2-chloroethyl, 3-chloropropyl, 2-chloropropyl, bromomethyl, iodomethyl, 3-iodopropyl, methoxymethyl, ethoxymethyl, phenoxymethyl, aminomethyl, N-methylaminomethyl, N,N-dimethylaminomethyl, N-ethylaminomethyl, N,N-diethylaminomethyl, acetoxymethyl, methylcarbamate, and 2-cyanoethyl groups.

X in formula (1) is a hydroxy group or a hydrolyzable group. The hydrolyzable group may be any known hydrolyzable group. Examples include hydrogen and halogen atoms, alkoxy, acyloxy, ketoximate, amino, amide, acid amide, aminooxy, mercapto, and alkenyloxy groups. Among these, a hydrogen atom, alkoxy, acyloxy, ketoximate, amino, amide, aminooxy, mercapto, and alkenyloxy groups are preferred. Alkoxy groups such as methoxy and ethoxy groups are more preferred because they have mild hydrolyzability and are easy to handle. Particularly preferred is a methoxy or ethoxy group.

The heteroatom-containing reactive silyl group preferably has two hydrolysable or hydroxy groups to easily provide rapid curability.

Examples of $R^2$ in formula (1) include, but not limited to, alkyl groups such as methyl and ethyl groups; cycloalkyl groups such as a cyclohexyl group; aryl groups such as a phenyl group; and aralkyl groups such as a benzyl group. Among these, a methyl group is particularly preferred.

Examples of the heteroatom-containing reactive silyl group in formula (1) include, but not limited to, chloromethylmethoxymethylsilyl, bis(chloromethyl)methoxysilyl, chloromethyldimethoxysilyl, chloromethyldiethoxysilyl, dichloromethyldimethoxysilyl, chloroethyldimethoxysilyl, chloropropyldimethoxysilyl, methoxymethyldimethoxysilyl, methoxymethyldiethoxysilyl, ethoxymethyldimethoxysilyl, aminomethyldimethoxysilyl, dimethylaminomethyldimethoxysilyl, diethylaminomethyldimethoxysilyl, diethylaminomethyldiethoxysilyl, N-(2-aminoethyl)-aminomethyldimethoxysilyl, aminopropyldimethoxysilyl, N-methylaminopropyldimethoxysilyl, N,N-dimethylaminopropyl-dimethoxysilyl, 3-(2-aminoethyl)aminopropyldimethoxysilyl, 3,3,3-trifluoropropyldimethoxysilyl, acetoxymethyldimethoxysilyl, and acetoxymethyldiethoxysilyl groups. Among these, chloromethyldimethoxysilyl, methoxymethyldimethoxysilyl, methoxymethyldiethoxysilyl, diethylaminomethyldiethoxysilyl, and 3,3,3-trifluoropropyldimethoxysilyl groups are preferred in view of easy synthesis. Chloromethyldimethoxysilyl, methoxymethyldimethoxysilyl, and diethylaminomethyldiethoxysilyl groups are more preferred because cured products having a higher degree of cure can be obtained. Particularly preferred is a methoxymethyldimethoxysilyl group.

Specific examples of $R^8$ include divalent hydrocarbon linking groups such as $-CH_2-$, $-CH_2CH_2-$, $-CH_2CH_2CH_2-$, and $-CH_2CH_2CH_2CH_2-$. Among these, $-CH_2CH_2-$ is preferred in view of reactivity and easy production.

(II) When the linking group W in formula (1) is not $-O-R^8-$:

It is essential that the polymer end of the organic polymer (A) is bonded to the silicon atom of the reactive silyl group via a linking group represented by formula (3) below, namely, that $-W-CH_2-$ in formula (1) is represented by formula (3):

$$-W^1-CH_2- \qquad (3)$$

wherein $W^1$ is a linking group selected from $-O-CO-N(R^9)-$, $-N(R^9)-CO-O-$, $-N(R^9)-CO-N(R^9)-$, $-S-CO-NH-$, or $-NH-CO-S-$; and $R^9$ is hydrogen, an optionally halogen-substituted cyclic, linear, or branched C1-C18, preferably C1-C6 alkyl or alkenyl group, or a C6-C18, preferably C6-C12 aryl group.

The organic polymer (A) of the present invention into which a specific linking group is introduced shows rapid curability as compared to other organic polymers in which the silicon atom of the reactive silyl group is bonded to the polymer end of the organic polymer via a hydrocarbon group having two or more carbon atoms.

The linking group —W—CH$_2$— in formula (1) is represented by —W$^1$—CH$_2$—, specifically when an organic polymer terminated with, for example, a hydroxy group, an isocyanate group, or an amino group is reacted with a silane compound containing an isocyanatomethyl group and a hydrolyzable group, such as 1-isocyanatomethyl-trimethoxysilane, 1-isocyanatomethyl-triethoxysilane, 1-isocyanatomethyl-dimethoxymethylsilane, or 1-isocyanatomethyl-diethoxymethylsilane.

When the linking group W in formula (1) is not —O—R$^8$—, specific examples of the structure of the group represented by —SiR$^1_a$R$^2_b$X$_c$ in formula (1) include chloromethylmethoxymethylsilyl, bis(chloromethyl)methoxysilyl, chloromethyldimethoxysilyl, chloromethyldiethoxysilyl, dichloromethyldimethoxysilyl, chloroethyldimethoxysilyl, chloropropyldimethoxysilyl, methoxymethyldimethoxysilyl, methoxymethyldiethoxysilyl, ethoxymethyldimethoxysilyl, aminomethyldimethoxysilyl, dimethylaminomethyldimethoxysilyl, diethylaminomethyldimethoxysilyl, diethylaminomethyldiethoxysilyl, N-(2-aminoethyl)-aminomethyldimethoxysilyl, aminopropyldimethoxysilyl, N-methylaminopropyldimethoxysilyl, N,N-dimethylaminopropyl-dimethoxysilyl, 3-(2-aminoethyl)aminopropyldimethoxysilyl, 3,3,3-trifluoropropyldimethoxysilyl, acetoxymethyldimethoxysilyl, acetoxymethyldiethoxysilyl, methyldimethoxysilyl, methyldiethoxysilyl, methyldiisopropoxysilyl, trimethoxysilyl, triethoxysilyl, triisopropoxysilyl, methoxydimethylsilyl, and ethoxydimethylsilyl groups. Among these, methyldimethoxysilyl, methyldiethoxysilyl, trimethoxysilyl, and triethoxysilyl groups are more preferred in view of availability of silane compounds containing an isocyanatomethyl group and a hydrolyzable group as raw materials. Of these, a methyldimethoxysilyl group is most preferred in terms of reactivity balance.

The backbone of the reactive silyl group-containing organic polymer (A) of the present invention is not particularly limited, and those having various backbones can be used.

Specific examples of the backbone include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polylmers such as ethylene-propylene copolymers, polyisobutylene, copolymers of isobutylene and isoprene or other monomers, polychloroprene, polyisoprene, copolymers of isoprene or butadiene with acrylonitrile and/or styrene or other monomers, polybutadiene, copolymers of isoprene or butadiene with acrylonitrile and styrene or other monomers, and hydrogenated polyolefin polymers obtained by hydrogenation of the foregoing polyolefin polymers; polyester polymers obtained by condensation of dibasic acids such as adipic acid and glycols, or ring-opening polymerization of lactones; (meth) acrylate (co)polymers obtained by radical polymerization of (meth)acrylate monomers such as methyl (meth)acrylate, ethyl (meth)acrylate, butyl (meth)acrylate, 2-ethylhexyl (meth)acrylate, and stearyl (meth)acrylate; vinyl copolymers obtained by radical polymerization of monomers such as (meth)acrylate monomers, vinyl acetate, acrylonitrile, and styrene; graft polymers obtained by polymerization of monomers such as (meth)acrylate monomers, vinyl acetate, acrylonitrile, and styrene in the presence of the foregoing organic polymers; polysulfide polymers; polyamide polymers such as nylon 6 obtained by ring-opening polymerization of ε-caprolactam, nylon 6,6 obtained by condensation polymerization of hexamethylenediamine and adipic acid, nylon 6,10 obtained by condensation polymerization of hexamethylenediamine and sebacic acid, nylon 11 obtained by condensation polymerization of ε-aminoundecanoic acid, nylon 12 obtained by ring-opening polymerization of ε-aminolaurolactam, and copolymerized nylons containing two or more of the foregoing nylon components; polycarbonate polymers obtained by condensation polymerization of bisphenol A and carbonyl chloride; and diallylphthalate polymers. In the above description, the term "(meth)acrylate", for example, refers to an acrylate and/or a methacrylate.

Among these, saturated hydrocarbon polymers such as polyisobutylene, hydrogenated polyisoprene, and hydrogenated polybutadiene, polyoxyalkylene polymers, and (meth) acrylate (co)polymers are more preferred because they have relatively low glass transition temperatures, and the resulting cured products show excellent cold resistance. The glass transition temperature of the reactive silyl group-containing organic polymer (A) of the present invention is not particularly limited, but it is preferably 20° C. or lower, more preferably 0° C. or lower, particularly preferably −20° C. or lower. When the glass transition temperature is higher than 20° C., the viscosity may increase during winter or in cold climates, resulting in poor workability. In addition, the cured product may have reduced flexibility and lower elongation. The glass transition temperature is measured by DSC.

Polyoxyalkylene polymers or (meth)acrylate (co)polymers are particularly preferred because they have high moisture permeability to provide excellent depth curability when it is prepared into a one-pack composition, and also have excellent adhesion. Of these, polyoxyalkylene polymers are most preferred.

Polyoxyalkylene polymers have repeating units represented by —R$^{11}$—O— wherein R$^{11}$ is a C1-C14 linear or branched alkylene group. More preferably, R$^{11}$ is a C2-C4 linear or branched alkylene group. Specific examples of the repeating unit of —R$^{11}$—O— include —CH$_2$O—, —CH$_2$CH$_2$O—, —CH$_2$CH(CH$_3$)O—, —CH$_2$CH(C$_2$H$_5$)O—, —CH$_2$C(CH$_3$)(CH$_3$)O—, and —CH$_2$CH$_2$CH$_2$CH$_2$O—. The backbone of the polyoxyalkylene polymer may consist only of one type of repeating unit or may consist of two or more types of repeating units. Particularly for use in applications such as sealants and adhesives, the polyoxyalkylene polymer preferably includes a polyoxypropylene polymer having a backbone containing 50% by weight or more, preferably 80% by weight or more of oxypropylene repeating units because it is amorphous and has a relatively low viscosity.

The backbone of the polyoxyalkylene polymer may be linear or branched. When the backbone is branched, the number of branches is preferably 1 to 6 (i.e., the number of terminal hydroxy groups is 3 to 8), more preferably 1 to 4 (i.e., the number of terminal hydroxy groups is 3 to 6), most preferably 1 (i.e., the number of terminal hydroxy groups is 3). The linear backbone is suitable particularly to provide high elongation which is the effect of the present invention.

The polyoxyalkylene polymer is preferably obtained by ring-opening polymerization of a cyclic ether compound using a polymerization catalyst in the presence of an initiator. Examples of the cyclic ether compound include ethylene oxide, propylene oxide, butylene oxide, tetramethylene oxide, and tetrahydrofuran. These cyclic ether compounds may be used alone or in combinations of two or more. Among these cyclic ether compounds, propylene oxide is particularly preferred because it can form a polyether polymer that is amorphous and has a relatively low viscosity. Specific examples of the initiator include alcohols such as ethylene glycol, propylene glycol, butanediol, hexamethylene glycol, neopentyl glycol, diethylene glycol, dipropylene glycol, triethylene glycol, glycerin, trimethylolmethane, trimethylolpropane, pentaerythritol, and sorbitol; and polyoxyalkylene polymers having a number average molecular weight of 300 to 4,000 such as polyoxypropylene diol, polyoxypropylene triol, polyoxyethylene diol, and polyoxyethylene triol.

The polyoxyalkylene polymer may be synthesized by any method such as: a polymerization method using an alkali catalyst such as KOH; a polymerization method using a transition metal compound-porphyrin complex catalyst such as a complex obtained by reacting an organoaluminum compound with porphyrin, as disclosed in JP-A S61-215623; a polymerization method using a double metal cyanide complex catalyst, as disclosed in, for example, JP-B S46-27250, JP-B S59-15336, and U.S. Pat. Nos. 3,278,457, 3,278,458, 3,278,459, 3,427,256, 3,427,334, and 3,427,335; a polymerization method using a catalyst containing a polyphosphazene salt, as described in JP-A H10-273512; or a polymerization method using a catalyst containing a phosphazene compound, as described in JP-A H11-060722. The polymerization method using a double metal cyanide complex catalyst is more preferred in terms of production costs and because it allows for the production of polymers having a narrow molecular weight distribution.

Moreover, the backbone of the reactive silyl group-containing organic polymer (A) of the present invention may be a polyoxyalkylene polymer containing a urethane bond, a urea bond, or other bond components in the backbone as long as the effects of the present invention are not greatly impaired. Specific examples of such a polymer include polyurethane prepolymers.

The polyurethane prepolymer can be produced by known methods, such as by reacting a polyol compound with a polyisocyanate compound. Specific examples of the polyol compound include polyether polyols, polyester polyols, polycarbonate polyols, and polyether polyester polyols. Specific examples of the polyisocyanate compound include diphenylmethane diisocyanate, tolylene diisocyanate, xylylene diisocyanate, methylene-bis(cyclohexyl isocyanate), isophorone diisocyanate, and hexamethylene diisocyanate. The polyurethane prepolymer may be terminated either with a hydroxy group or an isocyanate group.

In the case of a curable composition containing the reactive silyl group-containing organic polymer (A) used in the present invention whose backbone contains a urethane bond, urea bond, and/or ester bond, the resulting cured product may be subject to cleavage of the backbone at the urethane bond, urea bond, and/or ester bond due to factors such as heat, which may significantly reduce the strength of the cured product.

If the reactive silyl group-containing organic polymer (A) used in the present invention has a large number of amide bonds (—$NR^{12}$—$C(=O)$— wherein $R^{12}$ is a hydrogen atom or a substituted or unsubstituted C1-C18 organic group) in the backbone, the polymer tends to have higher viscosity. In addition, the viscosity may increase after storage, possibly reducing the workability of the resulting composition. Furthermore, cleavage of amide bonds may occur due to factors such as heat. For this reason, when the backbone contains an amide bond, the average number of amide bonds per molecule is 1 to 10, preferably 1.5 to 5, more preferably 2 to 3. If the average number is less than 1, the curability may be insufficient, while if the average number is more than 10, the polymer may have a high viscosity so that it is difficult to handle. Consequently, the backbone of the reactive silyl group-containing organic polymer (A) of the present invention is most preferably a polyoxyalkylene polymer that does not contain a urethane, urea, ester, or amide bond in the backbone, to obtain a curable composition having excellent storage stability and excellent workability.

The reactive silyl group-containing organic polymer (A) of the present invention is preferably obtained by the following method (a) and/or method (b).

(a) The terminal hydroxy group of a hydroxy group-terminated polyoxyalkylene polymer is converted to an allyl group, followed by reaction with $HSiR^1{}_fR^2{}_gX_h$ (where f is 1 or 2, g is 0 or 1, h is 1 or 2, and f+g+h=3; and $R^1$, $R^2$, and X are as defined above in formula (1)) to obtain a polyoxyalkylene polymer.

(b) The terminal hydroxy group of a hydroxy group-terminated polyoxyalkylene polymer is reacted with an isocyanatomethylsilane compound represented by OCN—$CH_2$—$SiR^1{}_iR^2{}_jX_k$ (where i is 0, 1, or 2, j is 0, 1, or 2, k is 1, 2, or 3, and i+j+k=3; and $R^1$, $R^2$, and X are as defined above in formula (1)) to obtain a polyoxyalkylene polymer.

When a polyurethane prepolymer is used:
(b1) The terminal functional group (i.e. hydroxy, isocyanate, or amino group) of at least one polyurethane prepolymer selected from the group consisting of a hydroxy group-terminated polyurethane prepolymer, an isocyanate group-terminated polyurethane prepolymer, and an amino group-terminated polyurethane prepolymer is reacted with an isocyanatomethylsilane compound represented by OCN—$CH_2$—$SiR^1{}_iR^2{}_jX_k$ (where i is 0, 1, or 2, j is 0, 1, or 2, k is 1, 2, or 3, and i+j+k=3; and $R^1$, $R^2$, and X are as defined above in formula (1)) to obtain a reactive silyl group-containing polyurethane prepolymer.

Among these methods, the polymer obtained by the method (a) is preferred because it has a lower viscosity than the reactive silyl group-containing organic polymer obtained by the method (b) or (b1). The method (b) is also preferred to achieve a high conversion rate in a relatively short reaction time.

Examples of the method (a) for introduction of a reactive silyl group include those suggested in patent publications such as JP-B S45-36319, JP-B S46-12154, JP-A S50-156599, JP-A S54-6096, JP-A S55-13767, JP-A S55-13468, JP-A S57-164123, JP-B H3-2450, U.S. Pat. Nos. 3,632,557, 4,345,053, 4,366,307, and 4,960,844. Examples also include methods in which a reactive silyl group is introduced by, for example, hydrosilylation into a high molecular weight polyoxypropylene polymer having a number average molecular weight of 6,000 or more, a Mw/Mn of 1.6 or less, and a narrow molecular weight distribution, as suggested in JP-A S61-197631, JP-A S61-215622, JP-A S61-215623, and JP-A S61-218632, and methods suggested in JP-A H3-72527.

The molecular weight distribution (Mw/Mn) of the reactive silyl group-containing organic polymer (A) is preferably 1.6 or less, more preferably 1.5 or less, particularly preferably 1.4 or less, more particularly preferably 1.3 or less, most preferably 1.2 or less. The lower limit of the number average molecular weight of the reactive silyl group-containing organic polymer (A) is preferably 3,000 or more, more preferably 5,000 or more, still more preferably 7,000 or more, particularly preferably 10,000 or more. The upper limit of the number average molecular weight is preferably 100,000 or less, more preferably 50,000 or less, still more preferably 35,000 or less, particularly preferably 25,000 or less. If the number average molecular weight is less than 3,000, the cured product of the reactive silyl group-containing organic polymer (A) tends to have reduced elongation at break. If the number average molecular weight is more than 100,000, the reactive silyl group concentration tends to be too low, resulting in a slow cure rate. In addition, the reactive silyl group-containing organic polymer (A) tends to have an excessively high viscosity so that it is difficult to handle.

The number average molecular weight of the reactive silyl group-containing organic polymer (A) is defined as the molecular weight (terminal group-based molecular weight) corresponding to the number average molecular weight determined by directly measuring the terminal group concentration by titrimetric analysis based on the principles of the method for measuring hydroxyl value according to JIS K 1557 and the method for measuring iodine value according to JIS K 0070, and taking into account the structure (the degree of branching which depends on the polymerization initiator used) of the organic polymer.

The number average molecular weight of the reactive silyl group-containing organic polymer (A) can be relatively determined by preparing a calibration curve of the above-described terminal group-based molecular weight versus conventional polystyrene-equivalent number average molecular weight determined by GPC (GPC molecular weight) of organic polymer precursors, and converting the GPC molecular weight of the reactive silyl group-containing organic polymer (A) to a terminal group-based molecular weight.

In order to obtain a good rubbery cured product, the number of reactive silyl groups in the reactive silyl group-containing organic polymer (A) is 50% or higher, more preferably 60% or higher, particularly preferably 60 to 85% of the total molecular end groups. If the number of reactive silyl groups is lower than 50% of the total molecular end groups, the curability will be insufficient so that the cured product is less likely to exhibit good rubber elastic behavior. The lower limit of the average number of reactive silyl groups per molecule is preferably 0.8 or more, more preferably 1.0 or more, particularly preferably 1.2 or more. The upper limit is preferably 7 or less, more preferably 3.4 or less, particularly preferably 2.6 or less.

The organic polymer may have the reactive silyl group at a backbone end or a side chain end of the molecular chains, or at both. In particular, the reactive silyl group is preferably present at a backbone end of the molecular chains because, in such a case, the molecular weight between crosslinking points is increased so that a rubbery cured product having high strength, high elongation, and low elastic modulus can be easily obtained.

The average number of reactive silyl groups in the reactive silyl group-containing organic polymer (A) is defined as the average number determined by high resolution $^1$H-NMR quantification of protons on the carbon to which the reactive silyl group is directly bonded. When the average number of reactive silyl groups in the reactive silyl group-containing organic polymer (A) of the present invention is calculated, the denominator (number of molecules) used to calculate the average number of reactive silyl groups per molecule includes: the organic polymer precursor into which the reactive silyl group has not been introduced during the introduction of the reactive silyl group into the organic polymer precursor into which the reactive silyl group is to be introduced; and modified organic polymer precursors formed as by-products into which the reactive silyl group has not been introduced, as part of the reactive silyl group-containing organic polymer (A) component having the same backbone.

In the present invention, a reactive silyl group-containing organic polymer (P) different from the organic polymer (A) may be used in combination. The reactive silyl group-containing organic polymer (P) according to the present invention is not particularly limited as long as it is an organic polymer having a reactive silyl group represented by formula (4) below at a molecular chain end:

$$-V-SiR^2_dX_{3-d} \quad (4)$$

wherein $R^2$ and X are as defined above in formula (1); V is a C1-C8 divalent hydrocarbon group; d is 0, 1, or 2; and each occurrence of $R^2$ or X may be the same or different.

X in formula (4) is a hydroxy group or a hydrolyzable group. The hydrolyzable group may be any known hydrolyzable group, such as those mentioned above for formula (1). Alkoxy groups such as methoxy and ethoxy groups are more preferred because they have mild hydrolyzability and are easy to handle. Particularly preferred is a methoxy or ethoxy group. The number of X's is preferably 2 or 3 in terms of curability and storage stability and in order to obtain a cured product having good rubber elasticity.

Examples of $R^2$ in formula (4) include, but not limited to, those mentioned above for formula (1), with a methyl group being particularly preferred. Specific examples of the linking group V in formula (4) include divalent hydrocarbon linking groups such as —CH$_2$—, —CH$_2$CH$_2$—, —CH$_2$CH$_2$CH$_2$—, and —CH$_2$CH$_2$CH$_2$CH$_2$—.

Specific examples of the structure of the group represented by —SiR$^2_d$X$_{3-d}$ in formula (4) include trimethoxysilyl, triethoxysilyl, triisopropoxysilyl, dimethoxymethylsilyl, diethoxymethylsilyl, diisopropoxymethylsilyl, methoxydimethylsilyl, and ethoxydimethylsilyl groups. Trimethoxysilyl, triethoxysilyl, and dimethoxymethylsilyl groups are more preferred because they are highly active and provide good curability. Particularly preferred is a trimethoxysilyl group. In view of storage stability, a dimethoxymethylsilyl group is particularly preferred. A triethoxysilyl group is preferred in terms of safety because the alcohol produced in connection with the hydrolysis of the reactive silyl group is ethanol.

The backbone of the reactive silyl group-containing organic polymer (P) is not particularly limited and may be as described above for the backbone of the reactive silyl group-containing organic polymer (A). The backbone is preferably derived from polyoxypropylene diol and/or polyoxypropylene triol, more preferably polyoxypropylene diol, among others.

The reactive silyl group-containing organic polymer (P) according to the present invention is preferably produced by the following method (c):

(c) The terminal hydroxy group of a hydroxy group-terminated polyoxyalkylene polymer is converted to an allyl group, followed by reaction with a silane compound represented by HSiR$^2_d$X$_{3-d}$ (where R$^2$, X, and d are as defined above in formula (4)) to obtain a reactive silyl group-containing polyoxyalkylene polymer.

The molecular weight distribution (Mw/Mn) of the reactive silyl group-containing organic polymer (P) is preferably 1.6 or less, more preferably 1.5 or less, particularly preferably 1.4 or less, more particularly preferably 1.3 or less, most preferably 1.2 or less. The reactive silyl group-containing organic polymers (P) may be used alone or in combinations of two or more. The number average molecular weight of the reactive silyl group-containing organic polymer (P) is preferably 3,000 to 100,000, more preferably 5,000 to 50,000, particularly preferably 8,000 to 35,000, as determined by GPC calibrated with polystyrene standards. If the number average molecular weight is less than 3,000, the cured product of the reactive silyl group-containing organic polymer (P) tends to have reduced elongation at break. If the number average molecular weight is more than 100,000, the reactive silyl group concentration tends to be too low, resulting in a slow cure rate. In addition, the reactive silyl group-containing organic polymer (P) tends to have an excessively high viscosity so that it is difficult to handle.

In order to obtain a good rubbery cured product, the ratio (silylation rate) of the reactive silyl group introduced per molecule of the reactive silyl group-containing organic polymer (P) on average is higher than 50%, more preferably 60% or higher, particularly preferably 60 to 85% of the total molecular end groups. If the number of reactive silyl groups is less than 50% of the total molecular end groups, the curability will be insufficient so that the cured product is less likely to exhibit good rubber elastic behavior. The average number of reactive silyl groups per molecule is preferably 1 to 7, more preferably 1 to 3.4, particularly preferably 1 to 2.6.

The backbone of the reactive silyl group-containing organic polymer (P) is preferably a linear structure or a branched structure having 1 to 6 branches, more preferably a linear structure or a branched structure having 1 to 2 branches, particularly preferably a linear structure or a branched structure having one branch. As the number of chain ends bonded to the reactive silyl group per molecule increases, crosslink density increases, making it difficult to obtain good elongation properties. The linear backbone is suitable to provide high elongation which is the effect of the present invention.

The organic polymer may have the reactive silyl group at a backbone end or a side chain end of the molecular chains, or at both. In particular, the reactive silyl group is preferably present at a backbone end of the molecular chains because, in such a case, the molecular weight between crosslinking points is increased so that a rubbery cured product having high strength, high elongation, and low elastic modulus can be easily obtained.

The mixing ratio of the reactive silyl group-containing organic polymer (A) to the reactive silyl group-containing organic polymer (P) is not particularly limited, but the ratio (A):(P) is preferably 95:5 to 5:95 (parts by weight), more preferably 80:20 to 20:80 (parts by weight), particularly preferably 70:30 to 30:70 (parts by weight).

In the present invention, a reactive silyl group-containing (meth)acrylic polymer (Q) may be used in combination. The reactive silyl group-containing (meth)acrylic polymer (Q) is not particularly limited as long as it is a (meth)acrylic polymer having, at a molecular chain end and/or a side chain, a reactive silyl group represented by formula (4):

(4)

wherein $R^2$ and X are as defined above in formula (1); V is a C1-C8 divalent hydrocarbon group; d is 0, 1, or 2; and each occurrence of $R^2$ or X may be the same or different.

X in formula (4) is a hydroxy group or a hydrolyzable group. The hydrolyzable group may be any known hydrolyzable group. Examples include those mentioned above for formula (1). Alkoxy groups such as methoxy and ethoxy group are more preferred because they have mild hydrolyzability and are easy to handle. Particularly preferred is a methoxy or ethoxy group. The number of X's is preferably 2 or 3 in terms of curability and storage stability and in order to obtain a cured product having good rubber elasticity.

Examples of $R^2$ in formula (4) include, but not limited to, those mentioned above for formula (1), with a methyl group being particularly preferred.

Specific examples of the linking group V in formula (4) include divalent hydrocarbon linking groups such as —CH$_2$—, —CH$_2$CH$_2$—, —CH$_2$CH$_2$CH$_2$—, and —CH$_2$CH$_2$CH$_2$CH$_2$—.

Specific examples of the structure of the group represented by —SiR$^2_d$X$_{3-d}$ in formula (4) include trimethoxysilyl, triethoxysilyl, triisopropoxysilyl, dimethoxymethylsilyl, diethoxymethylsilyl, diisopropoxymethylsilyl, methoxydimethylsilyl, and ethoxydimethylsilyl groups. Trimethoxysilyl, triethoxysilyl, and dimethoxymethylsilyl groups are more preferred because they are highly active and provide good curability. Particularly preferred is a trimethoxysilyl group. In view of storage stability, a dimethoxymethylsilyl group is particularly preferred. A triethoxysilyl group is preferred in terms of safety because the alcohol produced in connection with the hydrolysis of the reactive silyl group is ethanol.

The monomeric units of the backbone of the reactive silyl group-containing (meth)acrylic polymer (Q) are not particularly limited, but preferably include one and/or two or more monomers (q) having a (meth)acrylic structure.

Specific examples of the monomer (q) having a (meth)acrylic structure include alkyl (meth)acrylate monomers such as methyl (meth)acrylate, ethyl (meth)acrylate, n-propyl (meth)acrylate, isopropyl (meth)acrylate, n-butyl (meth) acrylate, isobutyl (meth)acrylate, s-butyl (meth)acrylate, tert-butyl (meth)acrylate, neopentyl (meth)acrylate, n-hexyl (meth) acrylate, n-heptyl (meth) acrylate, 2-ethylhexyl (meth)acrylate, nonyl (meth)acrylate, decyl (meth)acrylate, undecyl (meth)acrylate, lauryl (meth)acrylate, tridecyl (meth) acrylate, tetradecyl (meth) acrylate, hexadecyl (meth)acrylate, stearyl (meth)acrylate, behenyl (meth)acrylate, and cyclohexyl (meth)acrylate; 2-methoxyethyl (meth) acrylate, 3-methoxybutyl (meth) acrylate, 2-hydroxyethyl (meth)acrylate, 2-hydroxypropyl (meth)acrylate, (meth) acrylic acid-ethylene oxide adducts, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth) acrylate, trifluoromethyl (meth) acrylate, perfluoroethyl (meth)acrylate, bis(trifluoromethyl) methyl (meth)acrylate, 2-trifluoromethyl-2-perfluoroethylethyl (meth) acrylate, 2-perfluorohexylethyl (meth) acrylate, 2-perfluorodecylethyl (meth) acrylate, 2-perfluorohexadecylethyl (meth) acrylate, dimethylaminoethyl (meth)acrylate, chloroethyl (meth) acrylate, tetrahydrofurfuryl (meth) acrylate, glycidyl (meth)acrylate, and other (meth)acrylate monomers. These may be used alone or in combinations of two or more.

Monomers copolymerizable with the above monomers may also be used as long as they do not impair physical properties. Examples of such monomers include styrene monomers such as styrene, vinyltoluene, α-methylstyrene, chlorostyrene, and styrenesulfonic acid; fluorine-containing vinyl monomers such as perfluoroethylene, perfluoropropylene, and vinylidene fluoride; maleic acid and derivatives thereof such as maleic acid, maleic anhydride, monoalkyl maleates, and dialkyl maleates; fumaric acid and derivatives thereof such as fumaric acid, monoalkyl fumarates, and dialkyl fumarates; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl ester monomers such as vinyl acetate, vinyl propionate, vinyl pivalate, vinyl benzoate, and vinyl cinnamate; olefin monomers such as ethylene and propylene; conjugated diene monomers such as butadiene and isoprene; (meth)acrylamides; (meth)acrylonitriles; and vinyl monomers such as vinyl chloride, vinylidene chloride, allyl chloride, allyl alcohol, ethyl vinyl ether, and butyl vinyl ether. These may be used alone or in combinations of two or more.

The monomeric units of the backbone of the reactive silyl group-containing (meth)acrylic polymer (Q) preferably include 50% by weight or more, more preferably 70% by weight or more of an alkyl (meth)acrylate monomer in view of compatibility with the reactive silyl group-containing organic polymer (A). Moreover, the alkyl (meth)acrylate monomer is preferably a combination of an alkyl (meth) acrylate monomer (c1) having a C1-C8 alkyl group and an alkyl (meth)acrylate monomer (c2) having a C9-C30 alkyl group. In this case, the ratio of the alkyl (meth)acrylate monomer (c1) to the alkyl (meth)acrylate monomer (c2) ((c1):(c2)) is preferably 95:5 to 40:60, more preferably 90:10 to 60:40 by weight.

When the component (c2) is not used in combination, it is preferably, for example, a combination of methyl (meth) acrylate, butyl (meth)acrylate, and an alkyl (meth)acrylate monomer having a C7-C9 alkyl group, or a combination of an alkyl (meth)acrylate monomer having a C1-C2 alkyl group and an alkyl (meth)acrylate monomer having a C7-C9 alkyl group in view of compatibility with the reactive silyl group-containing organic polymer (A).

The reactive silyl group-containing (meth)acrylic polymer (Q) can be produced by various polymerization methods which are not particularly limited, and preferably by radical polymerization methods in view of monomer versatility and easy control.

The radical polymerization methods can be classified into "general radical polymerization methods" and "controlled radical polymerization methods". The "general radical polymerization methods" are simple polymerization methods in which a polymerization initiator such as an azo compound or peroxide is used to simply effect polymerization. On the other hand, the "controlled radical polymerization methods" can introduce a specific functional group into a controlled site such as a chain end. The "controlled radical polymerization methods" can be further classified into "chain transfer agent methods" and "living radical polymerization methods". The "chain transfer agent methods" are characterized in that polymerization is carried out using a chain transfer agent having a specific functional group, thereby producing a vinyl polymer terminated with a functional group. On the other hand, the "living radical polymerization methods" are characterized in that the growing polymer end grows without causing side reactions such as a termination reaction, thereby producing a polymer having a molecular weight substantially as designed. In the present invention, any of these polymerization methods may be used.

Specific examples of the "general radical polymerization methods" include solution polymerization, bulk polymerization, and other methods in which materials such as a polymerization initiator, a chain transfer agent, and a solvent are added to cause polymerization at 50° C. to 150° C.

Examples of the polymerization initiator include azo compounds such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis[N-(2-propenyl)-2-methylpropionamide], and 1,1'-azobis(cyclohexane-1-carbonitrile); diacyl peroxides such as benzoyl peroxide, isobutyryl peroxide, isononanoyl peroxide, decanoyl peroxide, lauroyl peroxide, parachlorobenzoyl peroxide, and di(3, 5,5-trimethylhexanoyl) peroxide; peroxydicarbonates such as diisopropyl perdicarbonate, di-sec-butyl perdicarbonate, di-2-ethylhexyl perdicarbonate, di-1-methylheptyl perdicarbonate, di-3-methoxybutyl perdicarbonate, and dicyclohexyl perdicarbonate; peroxyesters such as tert-butyl perbenzoate, tert-butyl peracetate, tert-butyl per-2-ethylhexanoate, tert-butyl perisobutyrate, tert-butyl perpivalate, tert-butyl diperadipate, and cumyl perneodecanoate; ketone peroxides such as methyl ethyl ketone peroxide and cyclohexanone peroxide; dialkyl peroxides such as di-tert-butyl peroxide, dicumyl peroxide, tert-butyl cumyl peroxide, and 1,1-di(tert-hexyl peroxy)-3,3,5-trimethylcyclohexane; hydroperoxides such as cumene hydroxyperoxide and tert-butyl hydroperoxide; and peroxides such as 1,1-di(tert-hexylperoxy)-3,3,5-trimethylcyclohexane. These polymerization initiators may be used alone or in combinations of two or more.

Examples of the chain transfer agent include mercapto group-containing compounds such as n-dodecyl mercaptan, tert-dodecyl mercaptan, and lauryl mercaptan. When it is desired to introduce a reactive silyl group into the molecular chain end of a (meth)acrylic polymer, a compound (c3) containing a reactive silyl group and a mercapto group is preferably used. Examples of the compound (c3) include 3-mercaptopropyltrimethoxysilane, 3-mercaptopropylmethyldimethoxysilane, mercaptomethyltrimethoxysilane, mercaptomethylmethyldimethoxysilane, 3-mercaptopropylchloromethyldimethoxysilane, 3-mercaptopropylmethoxymethyldimethoxysilane, 3-mercaptopropylaminomethyldimethoxysilane, and 3-mercaptopropyl-N,N-dimethylaminomethyldimethoxysilane. These may be used alone or in combinations of two or more.

Examples of the solvent include aromatic compounds such as toluene, xylene, styrene, ethylbenzene, paradichlorobenzene, di-2-ethylhexyl phthalate, and di-n-butyl phthalate; hydrocarbon compounds such as hexane, heptane, octane, cyclohexane, and methylcyclohexane; carboxylate compounds such as butyl acetate, n-propyl acetate, and isopropyl acetate; ketone compounds such as methyl isobutyl ketone and methyl ethyl ketone; dialkyl carbonate compounds such as dimethyl carbonate and diethyl carbonate; and alcohol compounds such as n-propanol, 2-propanol, n-butanol, 2-butanol, isobutanol, tert-butanol, and amyl alcohol. Among these, one or more solvents selected from dialkyl carbonate compounds and alcohol compounds are preferred because they are not substances for which guideline values are established by the Ministry of Health, Labour and Welfare, Japan, and also in view of factors such as odor and environmental burden. Moreover, dimethyl carbonate, n-propanol, 2-propanol, n-butanol, 2-butanol, isobutanol, and tert-butanol are more preferred, with 2-propanol or isobutanol being particularly preferred, in terms of boiling point and in order to reduce emissions of all the volatile organic compounds from the composition according to GEV Specification and Classification Criteria (edition: Feb. 14, 2001) prescribed by GEV (Gemeinschaft Emissionskontrollierte Verlegewerkstoffe, e.V.).

When no solvent is used, the polymerization may be carried out in the presence of, for example, a reactive silyl group-containing organic polymer or its precursor compound, or a plasticizer which will be described later.

The "chain transfer agent methods" can quantitatively introduce a functional group into the polymer end as compared to "general radical polymerization methods". Unlike the above polymerization methods, the "living radical polymerization methods" can produce a polymer having any molecular weight, a narrow molecular weight distribution, and a low viscosity, and further can introduce a monomer containing a specific functional group into almost any site of the polymer. The living polymerization in a narrow sense refers to a polymerization in which the chain ends are always kept active so that the molecular chains continue growing. In general, it also includes quasi-living polymerization in which the molecular chains continue growing with the inactivated and activated chain ends in equilibrium.

Examples of the "living radical polymerization methods" include methods using cobalt porphyrin complexes as described in Journal of the American Chemical Society (J. Am. Chem. Soc.), 1994, vol. 116, p. 7943, methods using nitroxide radicals as described in JP-T 2003-500378, and atom transfer radical polymerization (ATRP) methods using initiators such as organic halides or halogenated sulfonyl compounds and transition metal complex catalysts as described in JP-A H11-130931. In the present application, the atom transfer radical polymerization methods include so-called reverse atom transfer radical polymerization as described in Macromolecules, 1999, vol. 32, p. 2872, which is a polymerization method that produces a highly oxidized state as obtained when radicals are produced by usual atom transfer radical polymerization catalysts, e.g. by reacting a common radical initiator such as peroxide with Cu(II') derived from Cu(I) as a catalyst, thereby producing an equilibrium state similar to atom transfer radical polymerization.

Other polymerization methods that can be used include methods in which a metallocene catalyst and a thiol compound having at least one reactive silyl group in the molecule are used to produce an acrylic polymer as disclosed in JP-A 2001-040037, and high temperature continuous polymerization methods in which a mixing tank reactor is used to continuously polymerize a vinyl monomer as disclosed in JP-T S57-502171, JP-A S59-006207, and JP-A S60-511992.

The method for introducing a reactive silyl group into a (meth)acrylic polymer is not particularly limited, and the following methods (i) to (iv) may be used, for example.

(i) A method of copolymerizing a compound (c4) containing a polymerizable unsaturated group and a reactive silyl group with the monomer (q) having a (meth)acrylic structure.
(ii) A method of copolymerizing the monomer (q) having a (meth)acrylic structure in the presence of the compound (c3) containing a reactive silyl group and a mercapto group as a chain transfer agent.
(iii) A method of copolymerizing a compound containing a polymerizable unsaturated group and a reactive functional group (e.g. acrylic acid or 2-hydroxyethyl acrylate) with the monomer (q) having a (meth)acrylic structure, followed by reaction with a compound containing a reactive silyl group and a functional group reactive with the reactive functional group (e.g. isocyanate silane compounds).
(iv) A method of polymerizing the monomer (q) having a (meth)acrylic structure by a living radical polymerization method and then introducing a reactive silyl group into the molecular chain end.

These methods may be used in any combination.

Among these methods, a combination of methods (i) and (ii) is more preferred because a reactive silyl group can be introduced into a molecular chain end and/or a side chain. The method (iv) is more preferred in order to obtain a polymer having any molecular weight, a narrow molecular weight distribution, and a low viscosity.

Examples of the compound (c4) containing a polymerizable unsaturated group and a reactive silyl group include compounds containing a (meth)acryloxy group and a reactive silyl group such as 3-(meth)acryloxypropyltrimethoxysilane, 3-(meth)acryloxypropylmethyldimethoxysilane, 3-(meth)acryloxypropyltriethoxysilane, ((meth)acryloxymethyl)trimethoxysilane, ((meth)acryloxymethyl)methyldimethoxysilane, (meth) acryloxymethyldimethylmethoxysilane, 3-(meth)acryloxypropylchloromethyldimethoxysilane, 3-(meth)acryloxypropylmethoxymethyldimethoxysilane, 3-(meth)acryloxypropylaminomethyldimethoxysilane, and 3-(meth) acryloxypropyl-N,N-dimethylaminomethyldimethoxysilane; and compounds containing a vinyl group and a reactive silyl group such as vinyltrimethoxysilane, vinylmethyldimethoxysilane, vinyltriethoxysilane, vinylchloromethyldimethoxysilane, vinylmethoxymethyldimethoxysilane, vinylaminomethyldimethoxysilane, and vinyl-N,N-dimethylaminomethyldimethoxysilane. These compounds may be used alone or in combinations of two or more.

The number average molecular weight of the reactive silyl group-containing (meth)acrylic polymer (Q) according to the present invention is not particularly limited, but the lower limit is preferably 500 or more, more preferably 1,000 or more, as determined by GPC calibrated with polystyrene standards. The upper limit is preferably 100,000 or less, more preferably 50,000 or less, particularly preferably 30,000 or less.

The reactive silyl group-containing (meth)acrylic polymer (Q) according to the present invention may have a reactive silyl group introduced at a molecular chain end and/or a side chain, preferably at both a molecular chain end and a side chain in view of adhesion. The lower limit of the average number of reactive silyl groups per molecule is preferably 0.5 or more, more preferably 0.7 or more, particularly preferably 1.0 or more. The upper limit is preferably 2.0 or less, more preferably 1.9 or less, particularly preferably 1.8 or less.

The ratio of the reactive silyl group-containing (meth) acrylic polymer (Q) blended is not particularly limited. For use in sealants or adhesives, the lower limit is preferably 10 parts by weight or more, more preferably 20 parts by weight or more, particularly preferably 40 parts by weight or more, per 100 parts by weight of the reactive silyl group-containing organic polymer (A). The upper limit is preferably 700 parts by weight or less, more preferably 500 parts by weight or less, particularly preferably 30 parts by weight or less. When it is less than 10 parts by weight, no sufficient effect can be produced on initial tack or tensile properties. When it is more than 700 parts by weight, the viscosity tends to increase, resulting in difficulty in handling.

The curable composition of the present invention further contains a compound (B) having 2 to 10 ethyloxy groups in the molecule but having no amino group in the molecule. The compound (B) is a C1-C20, preferably C2-C10, saturated hydrocarbon having one alkoxysilyl group, a C1-C20, preferably C2-C10 hydrocarbon having two or more alkoxysilyl groups, or a C1-C20, preferably C2-C10 polycarboxylic acid ester. Preferably, the compound (B) is free of reactive functional groups other than ethyloxy groups. When the compound (B) is used in combination, a cured product of the curable composition of the present invention has specific features, i.e., high elongation and improved elastic recovery. The number of ethyloxy groups in the molecule of the compound (B) is preferably 2 to 10, more preferably 3 to 8, most preferably 3 to 6. When the number of ethyloxy groups is outside the range indicated above, the resulting cured product will have higher modulus and lower elongation.

The compound (B) is preferably free of reactive functional groups other than ethoxy groups. Examples of the reactive functional groups include halogen atoms, amino, hydroxy, epoxy, carboxyl, vinyl, aryl, acryl, methacryl, isocyanate, mercapto, and ureido groups.

In the compound (B), the atom bonded to the ethyloxy group, which is a carbon atom or a silicon atom, is preferably bonded to at least one carbon atom. This is because when the atom bonded to the ethyloxy group is not bonded to a carbon atom, the cured product tends to show higher modulus and lower elongation. Moreover, the compound (B) contains no amino group in the molecule. If the compound (B) contains an amino group in the molecule, the condensation reaction of the ethyloxy groups of the compound (B) with the reactive silyl group of the organic polymer (A) tends to be accelerated, resulting in higher crosslink density and lower elongation.

The compound (B) is not particularly limited. Non-limiting examples of the compound (B) containing a silyl group include methyltriethoxysilane, ethyltriethoxysilane, propyltriethoxysilane, n-octyltriethoxysilane, hexadecyltriethoxysilane, phenyltriethoxysilane, dimethyldiethoxysilane, diethyldiethoxysilane, methylethyldiethoxysilane, phenyldiethoxysilane, diphenyldiethoxysilane, [2-(triethoxysilyl)ethylthio]acetic acid, 3-[2-(triethoxysilyl)ethylthio]propionic acid methyldiethoxysilylmethane, 1,2-bis(triethoxysilyl)ethane, 1,1-bis(triethoxysilyl)ethane, 1,3-bis(triethoxysilyl)-propane, 1,2-bis(triethoxysilyl)propane, 1,1-bis(triethoxysilyl)propane, 1,4-bis(triethoxysilyl)butane, 1,2-bis(methyldiethoxysilyl)ethane, 1,1-bis(methyldiethoxy-silyl)ethane, 1,3-bis(methyldiethoxysilyl)propane, 1,4-bis(methyldiethoxysilyl)butane, 3-glycidoxypropyl-triethoxysilane, 3-glycidoxypropylmethyldiethoxysilane, 2-(3,4-epoxycyclohexyl)ethyltriethoxysilane, p-styryl-triethoxysilane, 3-methacryloxypropyltriethoxysilane, 3-acryloxypropyltriethoxysilane, tris-(triethoxysilylpropyl)-isocyanurate, 3-ureidopropyltriethoxysilane, 3-mercaptopropyltriethoxysilane, 3-octanoylthio-1-propyl-triethoxysilane, bis(triethoxysilylpropyl)tetrasulfide, 3-isocyanatopropyltriethoxysilane, 3-chloropropyl-triethoxysilane, and 3-(triethoxysilyl)propyl-octadecyldimethylammonium.

Non-limiting examples of the compound (B) containing no silyl group include ethyl ethers such as diethyl ether, tetraethoxymethane, triethyl orthoacetate, acetal, diethylene glycol diethyl ether, triethylene glycol diethyl ether, tetraethylene glycol diethyl ether, triethyl orthoformate, diethoxymethane, 1,2-diethoxyethane, diethoxypropane, diethoxybutane, diethoxyhexane, and 1,2-diethoxyethene; ethyl esters of acids such as diethyl malonate, diethyl maleate, diethyl succinate, diethyl glutarate, diethyl adipate, diethyl pimelate, diethyl suberate, diethyl azelate, diethyl sebacate, diethyl phthalate, diethyl isophthalate, diethyl terephthalate, and diethyl ethoxymethylenemalonate; aromatic compounds such as 1,4-diethoxybenzene; and other compounds such as diethyl carbonate and diethyl pyrocarbonate.

Among these, 1,2-bis(triethoxysilyl)ethane, 1,3-bis(triethoxysilyl)propane, propyltriethoxysilane, n-octyltriethoxysilane, diethyl succinate, diethyl adipate, diethyl sebacate, and diethyl phthalate are preferred because they are produced on an industrial scale and easily available, and allow the effects of the present invention to be achieved. The compound (B) containing a silicon atom is preferred because it tends to provide higher elastic recovery than that containing no silicon atom. In particular, 1,2-bis(triethoxysilyl)ethane or 1,3-bis(triethoxysilyl)propane is preferred because they greatly contribute to elastic recovery due to the high proportion of ethyloxy groups in the molecule. Vinyltriethoxysilane is not suitable in some applications because the cured product may show poor residual tack.

The molecular weight of the compound (B) is preferably 100 or more, more preferably 120 or more, particularly preferably 150 or more. The upper limit of the molecular weight is preferably 1000 or less, more preferably 700 or less, particularly preferably 500 or less, most preferably 400 or less. The compound (B) having a molecular weight of at least 100 but not more than 1000 is preferred because it has excellent compatibility with the component (A). These compounds as the component (B) may be used alone or in combinations of two or more.

The compound (B) is used in an amount of 0.1 to 20 parts by weight per 100 parts by weight of the reactive silyl group-containing organic polymer (A). The amount is preferably 0.5 parts by weight or more, more preferably 1 part by weight or more, most preferably 1.5 parts by weight or more. The upper limit of the amount of the component (B) is 20 parts by weight or less, preferably 10 parts by weight or less, more preferably 8 parts by weight or less, most preferably 6 parts by weight or less. If the amount of the component (B) is less than 0.1 parts by weight, the effects of improving elongation or elastic recovery according to the present invention will be insignificant. An amount of more than 20 parts by weight may result in a decrease in curability.

In the compound (B), the atom bonded to the ethyloxy group is preferably bonded to at least one carbon atom. When the atom bonded to the ethyloxy group is bonded to, for example, a silicon atom, the resulting cured product tends to show lower elongation. Examples of such compounds include ethyl silicate and condensates thereof, 1,2-diethoxy-1,1,2,2-tetramethyldisilane, 1,1-diethoxy-1,2,2,2-tetramethyldisilane, 1,1,1-triethoxy-2,2,2-trimethyldisilane, 1,1,2-triethoxy-1,2,2-trimethyldisilane, 1,1,1,2-tetraethoxy-2,2-dimethyldisilane, and 1,1,2,2-tetraethoxy-1,2-dimethyldisilane. These compounds may be used to an extent that does not significantly affect elongation or elastic recovery.

Compounds containing an ethyloxy group and an amino group are not preferred because cured products formed from compositions containing such compounds tend to show lower elongation, but these compounds may be used to an extent that does not significantly affect the elongation or elastic recovery to be achieved by the present invention. Non-limiting examples of such compounds include 3-aminopropyltriethoxysilane, N-2-(aminoethyl)-3-aminopropyltriethoxysilane, 3-triethoxysilyl-N-(1,3-dimethyl-butylidene)propylamine, 3-(N-phenyl)aminopropyltriethoxysilane, bis(3-triethoxysilylpropyl)amine, 3-aminopropyltriethoxysilane in the ketimine form, and oligomers obtained by condensation of aminosilanes.

A condensation catalyst is added to the curable composition of the present invention in order to promote the hydrolysis and condensation of the reactive silyl group of the reactive silyl group-containing organic polymer (A) to cause crosslinking. The condensation catalyst may be any known catalyst. In particular, amine compounds or carboxylic acids are preferred because they cure the organic polymer (A) containing the reactive silyl group of formula (1) in a very short time.

The amine compound as a condensation catalyst is not particularly limited. Examples include aliphatic primary amines such as butylamine, octylamine, and laurylamine; aliphatic secondary amines such as dibutylamine, dioctylamine, and dilaurylamine; aliphatic tertiary amines such as trioctylamine; aliphatic unsaturated amines such as oleylamine; aromatic amines such as aniline; nitrogen-containing heterocyclic compounds such as pyridine, imidazole, morpholine, piperidine, 1,2-dimethyl-1,4,5,6-tetrahydropyrimidine, 1,8-diazabicyclo(5,4,0)undecene-7 (DBU), 6-(dibutylamino)-1,8-diazabicyclo(5,4,0)undecene-7 (DBA-DBU), 1,5-diazabicyclo(4,3,0)nonene-5 (DBN), 1,4-diazabicyclo(2,2,2)octane (DABCO), and aziridine; and other amines such as ethylenediamine, propylenediamine, N-methyl-1,3-propanediamine, diethylenetriamine, triethylenetetramine, 3-methoxypropylamine, 3-dimethylaminopropylamine, 3-diethylaminopropylamine, and 2,4,6-tris(dimethylaminomethyl)phenol; guanidines such as guanidine, phenylguanidine, and diphenylguanidine; and biguanides such as butylbiguanide, 1-o-tolylbiguanide, and 1-phenylbiguanide. Alternatively, aminosilanes may be used as condensation catalysts.

Among these, amidines such as 1,2-dimethyl-1,4,5,6-tetrahydropyrimidine, DBU, DBA-DBU, and DBN; guanidines such as guanidine, phenylguanidine, and diphenylguanidine; and biguanides such as butylbiguanide, 1-o-tolylbiguanide, and 1-phenylbiguanide are preferred because of their high activity. Aryl group-substituted biguanides such as 1-o-tolylbiguanide and 1-phenylbiguanide are preferred because high adhesion can be expected. The amine compounds that are solid at room temperature may be added in the form of fine powder or in the form of a solution or dispersion in a solvent or plasticizer.

Among amine compounds which are basic, amine compounds whose conjugate acids have a pKa of 11 or more also have high catalytic activity and are thus preferred. For example, 1,2-dimethyl-1,4,5,6-tetrahydropyrimidine, DBU, and DBN whose conjugate acids have a pKa of 12 or more are particularly preferred because they have high catalytic activity.

In the present invention, the amine compound as a condensation catalyst may be an amino group-containing silane coupling agent (hereinafter, also referred to as "aminosilane"). The amino group-containing silane coupling agent refers to a compound that contains a group containing a silicon atom bonded to a hydrolyzable group (hereinafter, also referred to as "hydrolyzable silyl group") and a substituted or unsubstituted amino group. The amino group-containing silane coupling agent is also effective as an adhesion promoter.

The substituent of the substituted amino group is not particularly limited, and examples include alkyl, aralkyl, and aryl groups.

The hydrolyzable silyl group is not particularly limited. Examples include hydrogen and halogen atoms, alkoxy, aryloxy, alkenyloxy, acyloxy, ketoximate, amino, amide, acid amide, aminooxy, and mercapto groups. A methoxy or ethoxy group is particularly preferred because they have mild hydrolyzability and are easy to handle. The number of hydrolyzable groups bonded to silicon atoms in the aminosilane is preferably 2 or more, particularly preferably 3 or more.

Any aminosilane may be used. Examples include γ-aminopropyltrimethoxysilane, γ-aminopropyltriethoxysilane, γ-aminopropylmethyldimethoxysilane, N-β-aminoethyl-γ-aminopropyltrimethoxysilane, N-β-aminoethyl-γ-aminopropylmethyldimethoxysilane, γ-ureidopropyltrimethoxysilane, γureidopropyltriethoxysilane, and N-phenyl-γ-aminopropyltrimethoxysilane.

Among these aminosilanes, aminosilanes containing an amino group (—NH$_2$) are preferred in terms of curability, and γ-aminopropyltrimethoxysilane, γ-aminopropyltriethoxysilane, γ-aminopropylmethyldimethoxysilane, and N-β-aminoethyl-γ-aminopropyltrimethoxysilane are preferred in terms of availability. Ketimine compounds that are hydrolyzed to form the above amine compounds can also be used as condensation catalysts.

The amount of the amino group-containing silane coupling agent is preferably 0.1 to 3.8 parts by weight, more preferably 0.5 to 3.0 parts by weight, per 100 parts by weight of the organic polymer (A). This is because when the amount of the amino group-containing silane coupling agent is less than 0.1 parts by weight, insufficient adhesion will be obtained, while when the amount is more than 3.8 parts by weight, curability or elastic recovery tends to decrease, and the cured product has lower elongation.

In the present invention, any carboxylic acid may be used as a condensation catalyst. Examples include linear saturated fatty acids such as acetic acid, propionic acid, butyric acid, caprylic acid, capric acid, lauric acid, and stearic acid; mono-en unsaturated fatty acids such as undecylenic acid, 2-hexadecenoic acid, 6-hexadecenoic acid, oleic acid, acrylic acid, and methacrylic acid; branched fatty acids such as linoelaidic acid, linoleic acid, versatic acid, and neodecanoic acid; fatty acids having a triple bond such as propiolic acid; alicyclic carboxylic acids such as naphthenic acid; oxygen-containing fatty acids such as acetoacetic acid, ethoxyacetic acid, glyoxylic acid, and glycolic acid; and halogen-substituted monocarboxylic acids such as chloroacetic acid, 2-chloroacrylic acid, and chlorobenzoic acid. Examples of aliphatic dicarboxylic acids include acyclic dicarboxylic acids such as adipic acid, azelaic acid, sebacic acid, glutaric acid, oxalic acid, malonic acid, ethylmalonic acid, succinic acid, and 2,2-dimethylsuccinic acid; saturated dicarboxylic acids such as 1,2,2-trimethyl-1,3-cyclopentanedicarboxylic acid; and unsaturated dicarboxylic acids such as maleic acid and fumaric acid. Examples of aliphatic polycarboxylic acids include acyclic tricarboxylic acids such as citric acid. Examples of aromatic carboxylic acids include aromatic monocarboxylic acids such as benzoic acid and salicylic acid; and aromatic polycarboxylic acids such as phthalic acid and pyromellitic acid. Other examples include amino acids such as alanine and leucine. Carboxylic acid derivatives that produce carboxylic acids by hydrolysis of carboxylic anhydrides, esters, amides, or other compounds may also be used.

Among carboxylic acids used as condensation catalysts, for example, 2-ethylhexanoic acid, octylic acid, neodecanoic acid, oleic acid, and naphthenic acid are preferred because e.g. they are easily available, inexpensive, and well compatible with the reactive silyl group-containing organic polymer (A).

Examples of condensation catalysts other than the amine compounds and the carboxylic acids include metal salts of carboxylic acids such as tin carboxylates, zinc carboxylates, bismuth carboxylates, zirconium carboxylates, manganese carboxylates, and iron carboxylates; titanium compounds such as tetrabutyl titanate, tetrapropyl titanate, tetrakis (acetylacetonato)titanium, bis(acetylacetonato)diisopropoxytitanium, and bis(ethylacetoacetato)diisopropoxytitanium; dibutyltin compounds such as dibutyltin dilaurate, dibutyltin maleate, dibutyltin dioctanoate, dibutyltin bis(2-ethylhexanoate), dibutyltin diacetate, dibutyltin dimethoxide, dibutyltin oxide, dibutyltin bis(acetylacetonate), dibutyltin bis(ethylacetoacetonate), reaction products of dibutyltin oxide and silicate compounds, and reaction products of dibutyltin oxide and phthalic acid esters; aluminum compounds such as aluminum tris(acetylacetonate); zirconium compounds such as zirconium tetrakis(acetylacetonate); zinc compounds such as zinc acetate and zinc acetylacetonate; various metal alkoxide compounds such as tetrabutoxyhafnium; acidic organophosphates; organic sulfonic acids; and inorganic acids such as hydrochloric acid, phosphoric acid, and boronic acid. Zinc curing catalysts are commercially available from King Industries under the trade names such as K-KAT614, K-KAT635, K-KAT638, K-KAT639, and K-KAT643. However, organotin compounds have raised environmental and human health concerns. If used, they are preferably present in the composition at a low concentration, preferably at a concentration of 500 ppm or lower, more preferably 100 ppm or lower. Even metal compounds other than tin also have raised environmental and human health concerns. If used, they are preferably present in the composition at a concentration as low as 3% or lower, preferably 1% or lower.

Among these condensation catalysts, amine compounds or carboxylic acids are preferred in view of curability and environmental burden, with amine compounds being more preferred.

Two or more different condensation catalysts may be used in combination. For example, combinations of amine compounds and carboxylic acids are preferred because such combined use can be effective in improving curability.

The lower limit of the amount of the condensation catalyst is preferably 0.001 parts by weight, more preferably 0.01 parts by weight, still more preferably 0.1 parts by weight, per 100 parts by weight of the reactive silyl group-containing organic polymer (A), while the upper limit is preferably 30 parts by weight, more preferably 15 parts by weight, still more preferably 10 parts by weight. When the amount of the condensation catalyst is less than 0.001 parts by weight, the cure rate may be insufficient, and it may also be difficult to promote the curing reaction sufficiently. Also, when the amount of the condensation catalyst is more than 30 parts by weight, the working time of the curable composition tends to be reduced due to too high a cure rate, resulting in poor workability or poor storage stability.

The curable composition of the present invention may optionally contain additives such as plasticizers, adhesion promoters, fillers, physical property modifiers, anti-sagging agents (thixotropic agents), and stabilizers.

A plasticizer can be added to control the viscosity and slump properties of the curable composition and the mechanical properties such as tensile strength and elongation of the cured product obtained by curing the curable composition. Specific examples of the plasticizer include phthalate compounds such as dibutyl phthalate, diisononyl phthalate (DINP), di(2-ethylhexyl) phthalate, and diisodecyl phthalate (DIDP); terephthalate compounds such as bis(2-ethylhexyl)-1,4-benzene dicarboxylate (specifically, Eastman 168 (product name) available from Eastman Chemical Company); non-phthalate compounds such as 1,2-cyclohexane dicarboxylic acid diisononyl ester (specifically, Hexamoll DINCH (product name) available from BASF); aliphatic polycarboxylate compounds such as dioctyl adipate, dioctyl sebacate, and acetyl tributyl citrate; unsaturated fatty acid ester compounds such as butyl oleate; alkyl sulfonic acid phenyl esters (specifically, Mesamoll (product name) available from Lanxess); phosphate compounds such as tricresyl phosphate and tributyl phosphate; trimellitate compounds; chlorinated paraffins; hydrocarbon oils such as alkyl diphenyls; process oil; and epoxy plasticizers such as epoxidized soybean oil and benzyl epoxystearate.

The plasticizer may be a polymeric plasticizer. With the use of the polymeric plasticizer, the initial properties can be maintained for a long time as compared to when a low molecular weight plasticizer which contains no polymer component in the molecule is used. In addition, the polymeric plasticizer can improve the drying properties (coating properties) of an alkyd paint applied to the cured product. Non-limiting specific examples of the polymeric plasticizer include vinyl polymers obtained by polymerizing vinyl monomers by various methods; esters of polyalkylene glycols, such as diethylene glycol dibenzoate, triethylene glycol di(2-ethylhexanoate), and pentaerythritol esters; polyester plasticizers prepared from dibasic acids (e.g. sebacic acid, adipic acid, and phthalic acid) and divalent alcohols (e.g. ethylene glycol, diethylene glycol, triethylene glycol, propylene glycol, and dipropylene glycol); polyethers such as polyether polyols having a number average molecular weight of 500 or more, or even 1,000 or more, such as polyethylene glycol, polypropylene glycol, and polytetramethylene glycol, and their derivatives obtained by converting the hydroxy groups of the foregoing polyether polyols into ester, ether, or other groups; polystyrenes; polybutadiene; and polyisobutylene.

Among these, polymeric plasticizers compatible with the reactive silyl group-containing organic polymer (A) are preferred. In view of this, polyethers or vinyl polymers are preferred. Moreover, polyethers are preferred plasticizers because they improve surface curability and depth curability and do not cause cure retardation after storage. Polypropylene glycol is more preferred. Vinyl polymers are also preferred in terms of compatibility, weather resistance, and heat resistance. Among vinyl polymers, acrylic polymers and/or methacrylic polymers are preferred, with acrylic polymers such as polyalkyl acrylates being more preferred.

The number average molecular weight of the polymeric plasticizer is preferably 500 to 15,000, more preferably 1,000 to 5,000. The plasticizer having too low a molecular weight will bleed out over time due to heat or rain, and thus the initial properties cannot be maintained for a long time. Too high a molecular weight leads to increased viscosity, resulting in poor workability.

The molecular weight distribution of the polymeric plasticizer is not particularly limited, but it is preferably narrow, preferably less than 1.80. The number average molecular weight of the polymeric plasticizer is determined by GPC in the case of vinyl polymers, and by terminal group analysis in the case of polyether polymers. The molecular weight distribution (Mw/Mn) is determined by GPC (relative to polystyrene standards).

The polymeric plasticizer may or may not contain a reactive silyl group. When the polymeric plasticizer contains a reactive silyl group, it functions as a reactive plasticizer so that the migration of the plasticizer from the cured product can be prevented. When the polymeric plasticizer contains a reactive silyl group, the average number of reactive silyl groups per molecule is preferably 1 or less, more preferably 0.8 or less. When it is a reactive silyl group-containing plasticizer, particularly a reactive silyl group-containing polyether polymer, the number average molecular weight thereof needs to be lower than that of the reactive silyl group-containing organic polymer (A).

The amount of the plasticizer is preferably 5 to 150 parts by weight, more preferably 20 to 100 parts by weight per 100 parts by weight of the reactive silyl group-containing organic polymer (A). When the amount is less than 5 parts by weight, no plasticizer effect can be obtained. When the amount is more than 150 parts by weight, the cured product has insufficient mechanical strength. The plasticizers may be used alone or in combinations of two or more. Combinations of low molecular weight plasticizers and polymeric plasticizers may also be used. These plasticizers may be added during polymer production.

The curable composition of the present invention may incorporate, as an adhesion promoter, a silane coupling agent, a reaction product of a silane coupling agent, or a compound other than silane coupling agents. Specific examples of the silane coupling agent include isocyanate group-containing silanes such as γ-isocyanatopropyltrimethoxysilane, γ-isocyanatopropyltriethoxysilane, α-isocyanatomethyltrimethoxysilane, and α-isocyanatomethyldimethoxymethylsilane; amino group-containing silanes such as γ-aminopropyltrimethoxysilane, γ-aminopropyltriethoxysilane, γ-aminopropylmethyl-dimethoxysilane, N-β-aminoethyl-γ-aminopropyl-trimethoxysilane, N-β-aminoethyl-γ-aminopropylmethyl-dimethoxysilane, N-β-aminoethyl-γ-aminopropyl-triethoxysilane, and γ-ureidopropyltrimethoxysilane; mercapto group-containing silanes such as γ-mercaptopropyl-trimethoxysilane and γ-mercaptopropyltriethoxysilane; epoxy group-containing silanes such as γ-glycidoxypropyl-trimethoxysilane, γ-glycidoxypropyltriethoxysilane, γ-glycidoxypropylmethyl-dimethoxysilane, and β-(3,4-epoxycyclohexyl)ethyltrimethoxysilane; carboxysilanes such as β-carboxyethyltriethoxysilane; vinylically unsaturated group-containing silanes such as vinyltrimethoxysilane, vinyltriethoxysilane, γ-methacryloyloxypropylmethyl-dimethoxysilane, and γ-acryloyloxypropylmethyl-triethoxysilane; halogen-containing silanes such as γ-chloropropyltrimethoxysilane; and isocyanuratosilanes such as tris(trimethoxysilyl)isocyanurate. Other silane coupling agents include derivatives obtained by modifying the foregoing compounds, such as amino-modified silyl polymers, silylated amino polymers, unsaturated aminosilane complexes, phenylamino long-chain alkyl silanes, aminosilylated silicones, and silylated polyesters. The amount of the silane coupling agent used in the present invention is preferably 0.1 to 20 parts by weight, particularly preferably 0.5 to 10 parts by weight, per 100 parts by weight of the reactive silyl group-containing organic polymer (A).

The curable composition of the present invention may contain various fillers. Examples of the fillers include reinforcing fillers such as fumed silica, precipitated silica, crystalline silica, and carbon black; fillers such as heavy calcium carbonate, colloidal calcium carbonate, magnesium carbonate, diatomite, calcined clay, clay, talc, titanium oxide, and bentonite; and fibrous fillers such as asbestos, glass fibers and filaments. When a filler is used, the amount of the filler is 1 to 300 parts by weight, preferably 10 to 200 parts by weight, per 100 parts by weight of the reactive silyl group-containing organic polymer (A).

Hollow spheres such as balloons may be added to the curable composition of the present invention in order to reduce the weight (specific gravity) of the composition.

Non-limiting examples of the materials of the balloons include inorganic materials such as glass, shirasu, and silica, and organic materials such as phenolic resin, urea resin, polystyrene, Saran, and acrylonitrile. Moreover, inorganic and organic materials may be formed into a composite or may be layered to form a multilayer. Moreover, the surface of the balloons may be processed or coated before use, or the surface may be treated with various surface treatment agents before use.

The particle size of the balloons is preferably 3 to 200 µm, particularly preferably 10 to 110 µm. Balloons having a particle size of less than 3 µm have only a little contribution to weight reduction and thus need to be added in a large amount. Balloons having a particle size of 200 µm or more tend to form irregularities on the surface of the cured sealant or reduce elongation.

The amount of the hollow spheres is preferably 0.01 to 30 parts by weight per 100 parts by weight of the reactive silyl group-containing organic polymer (A). The lower limit is more preferably 0.1 parts by weight, while the upper limit is more preferably 20 parts by weight. An amount of less than 0.01 parts by weight tends to have no effect in improving workability. When the amount is more than 30 parts by weight, the cured product tends to show lower elongation and lower tensile strength at break.

The curable composition of the present invention may optionally incorporate a physical property modifier for adjusting the tensile properties of the resulting cured product. Any physical property modifier may be used. Examples include alkylalkoxysilanes such as methyltrimethoxysilane and dimethyldimethoxysilane; alkylisopropenoxysilanes such as dimethyldiisopropenoxysilane; functional group-containing alkoxysilanes such as γ-glycidoxypropyltrimethoxysilane, vinyltrimethoxysilane, and γ-mercaptopropyl-trimethoxysilane; silicone varnishes; and polysiloxanes. The physical property modifiers may be used alone or in combinations of two or more.

In particular, a compound that is hydrolyzed to form a compound having a monovalent silanol group in the molecule has the effect of reducing the modulus of the cured product without causing deterioration of the surface tackiness of the cured product. It is particularly preferably a compound that forms trimethylsilanol.

The physical property modifier is used in an amount of 0.1 to 20 parts by weight, preferably 0.5 to 10 parts by weight, per 100 parts by weight of the reactive silyl group-containing organic polymer (A).

An anti-sagging agent may optionally be added to the curable composition of the present invention in order to prevent sagging and improve workability. Non-limiting examples of the anti-sagging agent include polyamide waxes; hydrogenated castor oil derivatives; and metal soaps such as calcium stearate. These anti-sagging agents may be used alone or in combinations of two or more.

The anti-sagging agent is used in an amount of 0.1 to 20 parts by weight per 100 parts by weight of the reactive silyl group-containing organic polymer (A).

The curable composition of the present invention may contain an antioxidant (age resister). The antioxidant is preferably a hindered phenolic antioxidant. Examples of the hindered phenolic antioxidant include Irganox 245, Irganox 1010, and Irganox 1076 (all available from Ciba Japan K.K.).

The antioxidant is preferably used in an amount of 0.1 to 10 parts by weight, more preferably 0.2 to 5 parts by weight, per 100 parts by weight of the reactive silyl group-containing organic polymer (A).

The curable composition of the present invention may contain a light stabilizer. The light stabilizer can prevent photooxidative degradation of the cured product. Examples of the light stabilizer include benzotriazole compounds, hindered amine compounds, and benzoate compounds, with hindered amine compounds being particularly preferred.

The light stabilizer is preferably used in an amount of 0.1 to 10 parts by weight, more preferably 0.2 to 5 parts by weight, per 100 parts by weight of the reactive silyl group-containing organic polymer (A).

When the curable composition of the present invention contains a photocurable substance, particularly an unsaturated acrylic compound, a tertiary amine-containing hindered amine light stabilizer is preferably used to improve the storage stability of the composition. Examples of the tertiary amine-containing hindered amine light stabilizer include Tinuvin 622LD, Tinuvin 144, and Chimassorb 119FL (all available from Ciba Japan K.K.); Adekastab LA-57, LA-62, LA-67, and LA-63 (all available from Adeka Corporation); and Sanol LS-765 and LS-292 (all available from Sankyo Lifetech Co., Ltd.).

The curable composition of the present invention may contain an ultraviolet absorber. The ultraviolet absorber can increase the surface weather resistance of the cured product. Examples of the ultraviolet absorber include benzophenone compounds, benzotriazole compounds, salicylate compounds, substituted tolyl compounds, and metal chelate compounds, with benzotriazole compounds being particularly preferred.

The ultraviolet absorber is preferably used in an amount of 0.1 to 10 parts by weight, more preferably 0.2 to 5 parts by weight, per 100 parts by weight of the reactive silyl group-containing organic polymer (A). A combination of a hindered phenolic antioxidant, a hindered amine light stabilizer, and a benzotriazole ultraviolet absorber is preferably used.

Various additives may optionally be added to the curable composition of the present invention in order to control the properties of the curable composition or cured product. Examples of such additives include flame retardants, curability modifiers, radical inhibitors, metal deactivators, lubricants, pigments, blowing agents, solvents, and antifungal agents. These additives may be used alone or in combinations of two or more. Preferably, the curable composition contains substantially no solvent because the solvent added may cause odor or a spoiled appearance.

The curable composition of the present invention can be prepared as a one-pack composition in which all the formulation components are previously compounded and hermetically stored, and which is cured by moisture in the air after application. Alternatively, the curable composition can be prepared as a two-pack composition in which a curing catalyst, filler, plasticizer, water, and other components are compounded as a separate curing agent, and this compounded mixture is mixed with a polymer composition before use.

When the curable composition is a one-pack composition, since all the formulation components are previously compounded, it is preferred to dehydrate and dry water-containing formulation components prior to use or to dehydrate them, for example, under reduced pressure during compounding and kneading. When the curable composition is a two-pack composition, since the curing catalyst does not need to be added to the base mixture containing a reactive silyl group-containing polymer, gelation is less likely to occur even if a small amount of water is present in the formulation components; however, when long-term storage stability is required, the formulation components are preferably dehydrated and dried. Suitable methods for dehydration and drying are heat drying in the case of solids such as powder, and dehydration under reduced pressure or using, for example, synthetic zeolite, active alumina, or silica gel in the case of liquids. Alternatively, dehydration may be carried out by adding a small amount of an isocyanate compound to cause a reaction of water with the isocyanate group. The storage stability can be further improved by, in addition to performing the dehydration and drying method mentioned above, adding a lower alcohol such as methanol or ethanol or an alkoxysilane compound such as n-propyltrimethoxysilane or vinyltrimethoxysilane.

The amount of the dehydrating agent, particularly the silicon compound that can react with water, such as vinyltrimethoxysilane, is preferably 0.1 to 20 parts by weight, more preferably 0.5 to 10 parts by weight, per 100 parts by weight of the reactive silyl group-containing organic polymer (A).

The curable composition of the present invention sufficiently cures at room temperature, but may be heated to accelerate curing, if desired.

The curable composition of the present invention can be used as a construction sealant or an industrial adhesive. The curable composition can also be used as a sealant for, for example, buildings, ships, automobiles, or roads. Moreover, the curable composition can also be applied to various hermetically sealing compositions or adhesive compositions because it, either alone or with the aid of a primer, can adhere tightly to a wide range of substrates such as glass, ceramics, wood, metals, and resin moldings. Examples of the adhesive include, in addition to common adhesives, contact adhesives. The curable composition is also useful as a food packaging material, a rubber casting material, a molding material, or a paint. It is especially suitable as a sealant for working joints where significant movement of joints occurs. It is also suitable as a sealant for curtain walls, balcony window frames, stone materials, bridges, metal panels, or glass, or a fireproof sealant. It is still also suitable as a sealant for joints of exterior materials such as siding widely used in construction, ALC (autoclaved lightweight aerated concrete), RC (reinforced concrete), extrusion molding cement boards, mortar walls, or tiled walls.

The cured product obtained by curing the curable composition of the present invention preferably has an elongation at break of 380% or higher, more preferably 400% or higher. A cured product having an elongation at break of lower than 380% tends to break easily after long-term use. The cured product preferably has an elastic recovery rate of 65% or higher, more preferably 70% or higher. A cured product having an elastic recovery rate of lower than 65% tends to be gradually deformed under intermittent load, failing to sufficiently function as an adhesive; or, when such a cured product is used as a construction sealant for joints between exterior walls where significant movement occurs, the sealant portion tends to be corrugated or dented inward after long-term use. The "elongation at break" is determined according to JIS K 6251 in which No. 3 dumbbell specimens are punched out and subjected to tensile testing at a stretching rate of 200 mm/min at 23° C. and 50% RH. For the "elastic recovery rate", No. 3 dumbbell specimens prepared in the same manner for tensile properties are stretched to 100% elongation, held in this state at 23° C. and 50% RH for 24 hours, and then released from being stretched. Then, the proportion of recovery after one hour is defined as the elastic recovery rate.

EXAMPLES

The present invention is described in greater detail below using specific examples, but the present invention is not limited the following examples.

Synthesis Example 1

(Methoxymethyl)trimethoxysilane prepared by reference to the method described in Example 2 of JP-T 2007-513203 was reacted with 4 molar equivalents of acetyl chloride in the presence of 0.02 molar equivalents of zinc chloride as a catalyst. The reaction was carried out for 36 hours by heating under reflux to synthesize (methoxymethyl)trichlorosilane.

The (methoxymethyl)trichlorosilane purified by distillation was mixed with one molar equivalent of methyldichlorosilane (product name: LS-50, Shin-Etsu Chemical Co., Ltd.), and 0.05 molar equivalents of methyltributylammonium chloride was added to the mixture to cause a reaction by heating under reflux for 3 hours. Methoxymethyldichlorosilane was obtained at a conversion rate of about 50%.

Into a reaction vessel was charged trimethyl orthoacetate in an amount of 2.5 molar equivalents relative to the (methoxymethyl)dichlorosilane purified by distillation, and the (methoxymethyl)dichlorosilane was slowly added to the reaction vessel with sufficient stirring. The addition rate was adjusted so that the temperature of the reaction solution did not exceed 50° C. After the completion of addition, $^1$H-NMR spectral analysis (in CDCL$_3$ solvent with JNM-LA400 available from JEOL Ltd., referenced to the CHCL$_3$ peak at 7.26 ppm) confirmed that (methoxymethyl)dichlorosilane was almost quantitatively converted to (methoxymethyl)dimethoxysilane. The product was purified by distillation under reduced pressure to obtain (methoxymethyl) dimethoxysilane.

$^1$H-NMR spectral assignment: δ4.52 (t,1H), 3.60 (s,6H), 3.35 (s,3H), 3.19 (d,2H)

Synthesis Example 2

A mixture of polyoxypropylene diol having a molecular weight of about 3,000 and polyoxypropylene triol having a molecular weight of about 3,000 at a weight ratio of 1/1 was used as an initiator to polymerize propylene oxide in the presence of a zinc hexacyanocobaltate-glyme complex catalyst to obtain polypropylene oxide having a number average molecular weight of about 19,000 (a polystyrene-equivalent molecular weight determined with a solvent delivery system "HLC-8120 GPC" available from Tosoh Corporation, a column "TSK-GEL H" available from Tosoh Corporation, and THF solvent). Subsequently, a methanol solution of NaOMe in an amount of 1.2 equivalents per hydroxy group of the hydroxy group-terminated polypropylene oxide was added, followed by evaporating off methanol. Further, allyl chloride was added in an amount of 1.7 equivalents per hydroxy group to convert the terminal hydroxy groups to allyl groups.

To 100 parts by weight of the resulting crude allyl-terminated polypropylene oxide were added 300 parts by weight of n-hexane and 300 parts by weight of water, and they were mixed with stirring. Then, water was removed by centrifugation, and the resulting hexane solution was further mixed with 300 parts by weight of water with stirring. Water was again removed by centrifugation, and then hexane was removed by evaporation under reduced pressure. Thus, polypropylene oxide (a) terminated with an allyl group and having a number average molecular weight of about 19,000 and a molecular weight distribution of 1.31 was obtained.

Then, 100 parts by weight of the allyl-terminated polypropylene oxide (a) to which 36 ppm of a platinum vinyl siloxane complex (an isopropanol solution with a platinum content of 3 wt %) was added was reacted with 1.86 parts by weight of the (methoxymethyl)dimethoxysilane obtained in Synthesis Example 1 with stirring at 90° C. for 2 hours to obtain a reactive silyl group-containing polyoxypropylene polymer (A-1) terminated with a (methoxymethyl)dimethoxysilyl group and having 1.5 silyl groups on average per molecule and a number average molecular weight of 19,000.

Synthesis Example 3

An amount of 100 parts by weight of the allyl-terminated polypropylene oxide (a) obtained in Synthesis Example 2 to which 36 ppm of a platinum vinyl siloxane complex (an isopropanol solution with a platinum content of 3 wt %) was added was reacted with 1.35 parts by weight of methyldimethoxysilane with stirring at 90° C. for 2 hours to obtain a reactive silyl group-containing polyoxypropylene polymer (A-2) terminated with a methyldimethoxysilyl group and having 1.5 silyl groups on average per molecule and a number average molecular weight of 19,000.

Synthesis Example 4

An amount of 100 parts by weight of the allyl-terminated polypropylene oxide (a) obtained in Synthesis Example 2 to which 36 ppm of a platinum vinyl siloxane complex (an isopropanol solution with a platinum content of 3 wt %) was added was reacted with 1.55 parts by weight of trimethoxysilane with stirring at 90° C. for 2 hours to obtain a reactive silyl group-containing polyoxypropylene polymer (A-3) terminated with a trimethoxysilyl group and having 1.5 silyl groups on average per molecule and a number average molecular weight of 19,000.

Example 1

A mixture of the following components was prepared: 100 parts by weight of the reactive silyl group-containing polyoxypropylene polymer (A-1) obtained in Synthesis Example 2, 120 parts by weight of surface-treated colloidal calcium carbonate (product name: Hakuenka CCR, Shiraishi Kogyo Kaisha, Ltd.), 55 parts by weight of diisononyl phthalate as a phthalate plasticizer (product name: DINP, J-Plus, Co., Ltd.), 20 parts by weight of rutile titanium oxide (product name: Tipaque R-820, Ishihara Sangyo Kaisha, Ltd.), 2 parts by weight of a thixotropic agent (product name: Disparlon 6500, Kusumoto Chemicals, Ltd.), 1 part by weight of a hindered phenolic antioxidant (product name: Irganox 1010, BASF Japan), 1 part by weight of a hindered amine light stabilizer (product name: Tinuvin 770, BASF Japan), and 1 part by weight of a benzotriazole ultraviolet absorber (product name: Tinuvin 326, BASF Japan). The mixture was sufficiently kneaded, and then passed through a three-roll paint mill three times to obtain a dispersion as a base mixture, which was then left overnight in a constant temperature room at 23° C. and 50% RH. To 300 parts by weight of the base mixture were added 4 parts by weight of 1,2-bis(triethoxysilyl)ethane (product name: Dynasylan BTSE, Evonik), 3 parts by weight of vinyltrimethoxysilane (product name: Silquest A-171, Momentive), and 0.25 parts by weight of a phenylguanidine solution, followed by sufficient mixing to obtain a curable composition. Table 1 shows the formulation and physical property values of this curable composition.

The phenylguanidine solution is a 45 wt % solution obtained by dispersing and dissolving 1-phenylguanidine (product name) available from Nippon Carbide Industries Co., Inc. in TOPCIZER No. 7 (product name) available from Fuji Amide Chemical Co., Ltd.) by heating.

Examples 2 to 3 and Comparative Examples 1 to 4

Curable compositions were prepared in the same manner as in Example 1, except that the compounds listed in Table 1 were used instead of Dynasilan BTSE used in Example 1. The compounds used instead are as follows.

Dynasylan PTEO: Evonik, propyltriethoxysilane
Diethyl adipate: Wako Pure Chemical Industries, Ltd.
Ethyl silicate 40: Colcoat Co., Ltd., hydrolysis condensation product of ethyl silicate (pentamer on average)
Silquest A-1100: Momentive, γ-aminopropyltriethoxysilane
Silquest A-1110: Momentive, γ-aminopropyltrimethoxysilane
Dynasylan 1122: Evonik, bis(triethoxysilylpropyl)amine used in Example 1 were changed as follows: 2 parts by weight of 1,2-bis(triethoxysilyl)ethane, 2 parts by weight of vinyltrimethoxysilane, and 1 part by weight of the phenylguanidine solution. Table 2 shows the formulation and physical property values of this curable composition.

Examples 5 to 8 and Comparative Examples 5 to 20

Curable compositions were prepared in the same manner as in Example 4, except that the formulations were changed as shown in Table 2. The compounds used are as follows.

TABLE 1

| | | Example No. | | | | | | |
|---|---|---|---|---|---|---|---|---|
| | | Examples | | | Comparative Examples | | | |
| | | 1 | 2 | 3 | 1 | 2 | 3 | 4 |
| | Polymer (A-1) | 100 | 100 | 100 | 100 | 100 | 100 | 100 |
| | CCR | 120 | 120 | 120 | 120 | 120 | 120 | 120 |
| | DINP | 55 | 55 | 55 | 55 | 55 | 55 | 55 |
| | Tipaque R 820 | 20 | 20 | 20 | 20 | 20 | 20 | 20 |
| | Disparlon 6500 | 2 | 2 | 2 | 2 | 2 | 2 | 2 |
| | Irganox 1010 | 1 | 1 | 1 | 1 | 1 | 1 | 1 |
| | Tinuvin 770 | 1 | 1 | 1 | 1 | 1 | 1 | 1 |
| | Tinuvin 326 | 1 | 1 | 1 | 1 | 1 | 1 | 1 |
| Dynasylan BTSE | $(EtO)_3SiC_2H_4Si(OEt)_3$ | 4 | | | | | | |
| Dynasylan PTEO | $(EtO)_3SiC_3H_7$ | | 4 | | | | | |
| Diethyl adipate | $EtOC(=O)C_4H_8C(=O)OEt$ | | | 4 | | | | |
| Ethyl silicate 40 | $EtO(Si(OEt)_2O)_nEt$ | | | | 4 | | | |
| Silquest A-1100 | $(EtO)_3SiC_3H_6NH_2$ | | | | | 4 | | |
| Silquest A-1110 | $(MeO)_3SiC_3H_6NH_2$ | | | | | | 4 | |
| Dynasylan 1122 | $(EtO)_3SiC_3H_6NHC_3H_6Si(OEt)_3$ | | | | | | | 4 |
| Silquest A-171 | $(MeO)_3SiCH=CH_2$ | 3 | 3 | 3 | 3 | 3 | 3 | 3 |
| | Phenylguanidine solution | 0.25 | 0.25 | 0.25 | 0.25 | 0.25 | 0.25 | 0.25 |
| Tensile properties | 50% modulus (MPa) | 0.20 | 0.23 | 0.12 | 0.53 | 0.40 | 0.44 | 0.49 |
| of cured product | 100% modulus (MPa) | 0.35 | 0.36 | 0.21 | 0.97 | 0.71 | 0.76 | 0.87 |
| | Tensile strength at break (MPa) | 1.48 | 1.54 | 1.37 | 1.73 | 1.91 | 2.17 | 1.45 |
| | Elongation at break (%) | 675 | 630 | 915 | 205 | 350 | 355 | 200 |
| | Elastic recovery (%) | 91 | 89 | 86 | Unmeasurable due to breakage | 72 | 63 | 88 |
| Balance | Elongation at break (400% or higher) | Good | Good | Good | Poor | Poor | Poor | Poor |
| | Elastic recovery (70% or higher) | Good | Good | Good | — | Good | Poor | Good |

Examples 1 to 3 show physical properties obtained by the combined use of 100 parts by weight of an organic polymer (A) containing a specific reactive silyl group and a compound (B) having 2 to 10 ethyloxy groups in the molecule but having no amino group in the molecule. As shown in Table 1, such a combination resulted in a cured product having an elongation at break of 600% or higher and an elastic recovery as high as 80% or higher, and thus having a suitable balance as a construction sealant.

In Comparative Example 1 using ethyl silicate having 12 ethyloxy groups in the molecule, the cured product had a low elongation (205%), and the elastic recovery value could not be measured because the cured product broke while it was held stretched. In Comparative Examples 2 to 4, compounds containing an ethyloxy or methyloxy group and having an amino group in the molecule were used. In these cases, the cured products had a significantly low elongation (200 to 355%). It was presumed that the amino group increased the condensation reactivity of ethyloxy groups to increase crosslink density, causing a decrease in elongation.

Example 4

A curable composition was prepared in the same manner as in Example 1, except that the amounts of the components GENIOSIL STP-E30: Wacker, a polyoxypropylene polymer terminated with a dimethoxy(methyl)silylmethylcarbamate group
Silquest A-151: Momentive, vinyltriethoxysilane
Neostann U-220H: Nitto Kasei Co., Ltd., dibutyltin bis(acetylacetonate)
Neostann U-810: Nitto Kasei Co., Ltd., dioctyltin dilaurate
DBU: San-Apro Ltd., 1,8-diazabicyclo[5.4.0]undecene-7
K-KAT XK-643: King Industries, a zinc curing catalyst The physical properties of the prepared curable compositions were measured as described below.

(Tensile Properties of Cured Product)

A 3 mm-thick polyethylene mold was filled with each curable composition while avoiding entry of air bubbles, followed by curing at 23° C. and 50% RH for 3 days and then at 50° C. for 4 days to obtain a cured product. According to JIS K 6251, No. 3 dumbbell specimens were punched out from the cured products and subjected to tensile testing at a stretching rate of 200 mm/min at 23° C. and 50% RH to determine the modulus, tensile strength at break, and elongation at break at 50% or 100% elongation.

(Elastic Recovery)

No. 3 dumbbell specimens prepared in the same manner for the tensile properties were stretched to 100% elongation and held in this state at 23° C. and 50% RH for 24 hours. They were then released from being stretched, and the degree of recovery after one hour was measured. The elastic recovery is 100% if the specimen completely returns to its initial state; 0% if no recovery is observed.
(Skin Formation Time)

A mold having a thickness of about 5 mm was filled with each curable composition using a spatula at 23° C. and 50% RH, and the surface of the composition was flattened. The time point at which the surface was flattened was defined as the start time. The surface of the composition was touched by the spatula, and the time period required for the mixture to no longer stick to the spatula was determined.
(Residual Tack)

Each curable composition was stretched to a thickness of about 3 mm, and left at 23° C. and 50% RH. Then, the surface of the composition was gently touched with a finger at day 1 and day 7 to evaluate the degree of tackiness. The criteria are as follows: "A" indicates no tackiness, "B" indicates a slight tackiness, and "C" indicates a strong tackiness.

TABLE 2

| | | Examples | | | | | Comparative Examples | | | | | |
|---|---|---|---|---|---|---|---|---|---|---|---|---|
| | | 4 | 5 | 6 | 7 | 8 | 5 | 6 | 7 | 8 | 9 | 10 |
| Polymer (A-1) | | 100 | 100 | 100 | | | 100 | | | | | |
| Polymer (A-2) | | | | | | | | 100 | 100 | 100 | 100 | 100 |
| Polymer (A-3) | | | | | | | | | | | | |
| GENIOSIL STP-E30 | | | | | 100 | 100 | | | | | | |
| CCR | | 120 | 120 | 120 | 120 | 120 | 120 | 120 | 120 | 120 | 120 | 120 |
| DINP | | 55 | 55 | 55 | 55 | 55 | 55 | 55 | 55 | 55 | 55 | 55 |
| Tipaque R 820 | | 20 | 20 | 20 | 20 | 20 | 20 | 20 | 20 | 20 | 20 | 20 |
| Disparlon 6500 | | 2 | 2 | 2 | 2 | 2 | 2 | 2 | 2 | 2 | 2 | 2 |
| Irganox 1010 | | 1 | 1 | 1 | 1 | 1 | 1 | 1 | 1 | 1 | 1 | 1 |
| Tinuvin 770 | | 1 | 1 | 1 | 1 | 1 | 1 | 1 | 1 | 1 | 1 | 1 |
| Tinuvin 326 | | 1 | 1 | 1 | 1 | 1 | 1 | 1 | 1 | 1 | 1 | 1 |
| Dynasylan BTSE | $(EtO)_3SiC_2H_4Si(OEt)_3$ | 2 | | | 2 | | | | 2 | | | |
| Dynasylan PTEO | $(EtO)_3SiC_3H_7$ | | 2 | | | 2 | | | | | 2 | |
| Silquest A-151 | $(EtO)_3SiCH=CH_2$ | | | | | | | | | | | 2 |
| Diethyl adipate | $EtOC(=O)C_4H_8C(=O)OEt$ | | | 2 | | | | | | | | |
| Silquest A-1100 | $(EtO)_3SiC_3H_6NH_2$ | | | | | | | | | 2 | | |
| Silquest A-1110 | $(MeO)_3SiC_3H_6NH_2$ | | 2 | 2 | | | 2 | | | | | |
| Silquest A-171 | $(MeO)_3SiCH=CH_2$ | 2 | 2 | 2 | 4 | 4 | 2 | 2 | 2 | 2 | 2 | 2 |
| Phenylguanidine solution | | 1 | 1 | 1 | | | 1 | | | | | |
| Neostann U-220H | | | | | | | | 1 | 1 | 1 | 1 | 1 |
| Neostann U-810 | | | | | | | | | | | | |
| DBU | | | | | 0.1 | 0.1 | | | | | | |
| K-KAT XK-643 | | | | | | | | | | | | |
| Skin formation time (min) | | 35 | 15 | 20 | — | — | 15 | >480 | >480 | >300 | >480 | >480 |
| Residual tack | Day 1 | B | B~A | B~A | B~A | B~A | B~A | CD | BC | B | CB | CD |
| | Day 7 | A | A | A | A | A | A | B~A | B~A | B~A | B~A | B~A |
| Tensile properties of cured product | 50% modulus (MPa) | 0.33 | 0.36 | 0.37 | 0.41 | 0.35 | 0.38 | 0.24 | 0.36 | 0.28 | 0.25 | 0.26 |
| | 100% modulus (MPa) | 0.61 | 0.64 | 0.65 | 0.60 | 0.54 | 0.65 | 0.37 | 0.57 | 0.49 | 0.38 | 0.40 |
| | Tensile strength at break (MPa) | 1.73 | 2.01 | 1.97 | 2.18 | 2.01 | 2.04 | 1.95 | 1.33 | 1.76 | 1.48 | 1.70 |
| | Elongation at break (%) | 400 | 480 | 430 | 780 | 770 | 460 | 715 | 345 | 550 | 585 | 600 |
| | Elastic recovery (%) | 94 | 72 | 71 | 82 | 78 | 68 | 60 | 84 | 67 | 67 | 68 |
| Balance | Elongation at break (400% or higher) | Good | Good | Good | Good | Good | Good | Good | Poor | Good | Good | Good |
| | Elastic recovery (70% or higher) | Good | Good | Good | Good | Good | Poor | Poor | Good | Poor | Poor | Poor |

| | | Example No. Comparative Examples | | | | | | | | | |
|---|---|---|---|---|---|---|---|---|---|---|---|
| | | 11 | 12 | 13 | 14 | 15 | 16 | 17 | 18 | 19 | 20 |
| Polymer (A-1) | | | | | | | | | 100 | | |
| Polymer (A-2) | | 100 | 100 | 100 | | | | | | 100 | |
| Polymer (A-3) | | | | | 100 | 100 | 100 | 100 | | | 100 |
| GENIOSIL STP-E30 | | | | | | | | | | | |
| CCR | | 120 | 120 | 120 | 120 | 120 | 120 | 120 | 120 | 120 | 120 |
| DINP | | 55 | 55 | 55 | 55 | 55 | 55 | 55 | 55 | 55 | 55 |
| Tipaque R 820 | | 20 | 20 | 20 | 20 | 20 | 20 | 20 | 20 | 20 | 20 |
| Disparlon 6500 | | 2 | 2 | 2 | 2 | 2 | 2 | 2 | 2 | 2 | 2 |
| Irganox 1010 | | 1 | 1 | 1 | 1 | 1 | 1 | 1 | 1 | 1 | 1 |

TABLE 2-continued

|  |  |  |  |  |  |  |  |  |  |  |  |
|---|---|---|---|---|---|---|---|---|---|---|---|
|  | Tinuvin 770 | 1 | 1 | 1 | 1 | 1 | 1 | 1 | 1 | 1 | 1 |
|  | Tinuvin 326 | 1 | 1 | 1 | 1 | 1 | 1 | 1 | 1 | 1 | 1 |
| Dynasylan BTSE | $(EtO)_3SiC_2H_4Si(OEt)_3$ |  |  |  | 2 |  |  |  |  |  |  |
| Dynasylan PTEO | $(EtO)_3SiC_3H_7$ |  |  |  |  |  |  |  |  |  |  |
| Silquest A-151 | $(EtO)_3SiCH=CH_2$ |  |  |  |  |  |  |  |  |  |  |
| Diethyl adipate | $EtOC(=O)C_4H_8C(=O)OEt$ | 2 |  | 2 |  |  |  |  |  |  |  |
| Silquest A-1100 | $(EtO)_3SiC_3H_6NH_2$ |  |  |  |  | 2 |  |  |  |  |  |
| Silquest A-1110 | $(MeO)_3SiC_3H_6NH_2$ |  | 2 | 2 |  |  |  | 2 | 2 | 2 | 2 |
| Silquest A-171 | $(MeO)_3SiCH=CH_2$ | 2 | 2 | 2 | 2 | 2 | 2 | 2 | 2 | 2 | 2 |
|  | Phenylguanidine solution |  |  |  | 2 | 2 | 2 |  |  |  |  |
|  | Neostann U-220H | 1 | 1 | 1 |  |  |  |  |  |  |  |
|  | Neostann U-810 |  |  |  |  |  |  |  | 0.2 |  |  |
|  | DBU |  |  |  |  |  |  |  |  |  |  |
|  | K-KAT XK-643 |  |  |  |  |  |  |  |  | 2 | 2 | 2 |
|  | Skin formation time (min) | >480 | 90 | 90 | 55 | 40 | 40 | 30 | 60 | 340 | 180 |
| Residual tack | Day 1 | CD | B | B | B | B~A | B~A | B~A | C~B | C | C~B |
|  | Day 7 | B~A | B~A | B~A | B~A | A | A | A | C~B | C~B | C~B |
| Tensile properties of cured product | 50% modulus (MPa) | 0.23 | 0.28 | 0.30 | 0.43 | 0.42 | 0.44 | 0.49 | 0.31 | 0.28 | 0.41 |
|  | 100% modulus (MPa) | 0.36 | 0.52 | 0.53 | 0.83 | 0.76 | 0.83 | 0.93 | 0.51 | 0.47 | 0.75 |
|  | Tensile strength at break (MPa) | 1.64 | 2.17 | 2.18 | 1.72 | 1.78 | 1.92 | 1.81 | 1.57 | 1.92 | 2.38 |
|  | Elongation at break (%) | 660 | 615 | 620 | 260 | 310 | 280 | 250 | 510 | 635 | 450 |
|  | Elastic recovery (%) | 59 | 63 | 65 | 96 | 95 | 95 | 94 | 69 | 91 | 93 |
| Balance | Elongation at break (400% or higher) | Good | Good | Good | Poor | Poor | Poor | Poor | Good | Good | Good |
|  | Elastic recovery (70% or higher) | Poor | Poor | Poor | Good | Good | Good | Good | Poor | Good | Good |

Curable compositions containing an organic polymer (A) containing a specific reactive silyl group in combination with an amine curing catalyst and an aminosilane as shown as Comparative Example 5 in Table 2 have been disclosed in, for example, JP-A 2013-163787. However, unfortunately, they show low elastic recovery. In Example 4 in which 1,2-bis(triethoxysilyl)ethane was used instead of the aminosilane, the elastic recovery was found to be significantly high (94%) and therefore good, even though the modulus was lower than that in Comparative Example 5.

As shown in Examples 5 and 6, compositions containing an organic polymer (A) containing a specific reactive silyl group in combination with an aminosilane and the component (B) exhibited improved elastic recovery, although they were not much different from the composition of Comparative Example 5 not containing the component (B) in terms of modulus and elongation. Aminosilanes are components required to ensure adhesion. The combined use of an aminosilane results in a decrease in the absolute value of elastic recovery, but is effective in improving the balance. In Example 8 using a polymer terminated with a (methoxymethyl)diethoxysilyl group obtained in Synthesis Example 2, a good balance of high elongation and high elastic recovery was exhibited although the curability was slightly reduced.

The curable compositions of Comparative Examples 6 to 13 contained the organic polymer (A-3) containing a methyldimethoxysilyl group which is a common structure as a reactive silyl group. Since the methyldimethoxysilyl group-containing organic polymer takes several days to cure in the presence of an amine curing catalyst, a commonly used tin curing catalyst was used. When the methyldimethoxysilyl group-containing polymer (A-3) was used, low elastic recovery (60%) was exhibited as shown in Comparative Example 6. The compositions of Comparative Examples 8 and 12 in which such a system was combined with an aminosilane exhibited limited improvement in elastic recovery. As shown in Comparative Examples 9, 10, and 11, compositions containing the polymer (A-3) in combination only with the component (B) without using an aminosilane exhibited an elastic recovery of about 59 to 68% and therefore no remarkable improvement effect. In Comparative Example 7 using 2-bis(triethoxysilyl)ethane as the component (B), a high elastic recovery (84%) was exhibited but the elongation was inadequately low (345%). This is presumably because the crosslink density was increased by the reaction of the ethoxysilyl group of the component (B) with the component (A). As shown in Comparative Example 13, a composition containing the polymer (A-3) in combination with diethyl adipate as the component (B) and an aminosilane did not exhibit high elastic recovery.

The curable compositions of Comparative Examples 14 to 17 contained the organic polymer (A-4) containing a trimethoxysilyl group as a reactive silyl group. Unfortunately, curable compositions containing an organic polymer containing a trimethoxysilyl group show low elongation although they have high elastic recovery. When the organic polymer containing a trimethoxysilyl group was used, no improvement in elongation was observed even when the component (B) was added instead of the aminosilane.

The compositions of Examples 7 and 8 which contained a commercially available organic polymer terminated with a dimethoxy(methyl)silylmethylcarbamate group, the component (B), and DBU as a curing catalyst exhibited high elongation and high elastic recovery properties.

The composition of Comparative Example 18 which contained 100 parts by weight of the organic polymer (A-1) containing a specific reactive silyl group and a zinc curing catalyst exhibited slightly insufficient elastic recovery due to the use of the organic polymer (A-1), and also exhibited tackiness on the surface of the cured product.

The composition of Comparative Example 19 contained the methyldimethoxysilyl group-containing organic polymer (A-3) and a zinc curing catalyst. The resulting cured product exhibited high elongation and high elastic recovery. However, despite the fact that the curing catalyst was used in a somewhat large amount (2 parts by weight), the skin formation time took 5 hours or longer, and the cured product exhibited poor surface tackiness, and may also be difficult to use depending on the application because of the use of the metal catalyst.

The composition of Comparative Example 20 which contained an organic polymer containing a trimethoxysilyl group and a zinc curing catalyst exhibited high elongation and high elastic recovery as in Comparative Example 19. Despite the use of the polymer containing a highly active trimethoxysilyl group and 2 parts by weight of the curing catalyst, the skin formation time was slow (3 hours), and the surface tackiness of the cured product was poor.

As is clear from the examples and the comparative examples, the combined use of an organic polymer (A) containing a specific reactive silyl group and a compound (B) having 2 to 10 ethyloxy groups in the molecule but having no amino group in the molecule results in a cured product having high elongation and high elastic recovery. Such a cured product is superior from safety and environmental standpoints because it is free of any metal catalyst such as tin or zinc. Moreover, since the curable composition obtained according to the present invention has a high cure rate, it is possible to shorten the working process when the curable composition is used as a sealant or adhesive. Furthermore, since the surface tackiness of the cured product is low, the cured product when used as a sealant shows reduced adhesion of dirt and grime to its surface, and thus can maintain its aesthetic appearance for a long time.

The invention claimed is:

1. A curable composition, comprising:
   100 parts by weight of a reactive silyl group-containing organic polymer (A); and
   0.1 to 20 parts by weight of a compound (B) having 2 to 10 ethyloxy groups and no amino group,
   the organic polymer (A) having at a molecular chain end a reactive silyl group represented by formula (1):

$$—W—CH_2—SiR^1{}_aR^2{}_bX_c \quad (1)$$

wherein $R^1$ is a C1-C20 hydrocarbon group in which at least one hydrogen atom on carbon atoms at positions 1 to 3 is replaced with a group selected from the group consisting of a halogen atom, $—OR^3$, $—NR^4R^5$, $—N{=}R^6$, $—SR^7$, a C1-C20 perfluoroalkyl group, and a cyano group, wherein $R^3$, $R^4$, $R^5$, and $R^7$ are each a hydrogen atom or a C1-C20 monovalent substituted or unsubstituted hydrocarbon group, and $R^6$ is a C1-C20 divalent substituted or unsubstituted hydrocarbon group; $R^2$ is a C1-C20 hydrocarbon group, a C6-C20 aryl group, a C7-C20 aralkyl group, or a triorganosiloxy group represented by $R^0{}_3SiO—$ wherein the three $R^0$'s are C1-C20 hydrocarbon groups and may be the same as or different from each other; X is a hydroxy group or a hydrolyzable group; W is a linking group selected from the group consisting of $—O—R^8—$, $—O—CO—N(R^9)—$, $—N(R^9)—CO—O—$, $—N(R^9)—CO—N(R^9)—$, $—S—CO—NH—$, and $—NH—CO—S—$, wherein $R^8$ is a C1-C8 divalent hydrocarbon group, and $R^9$ is hydrogen, an optionally halogen-substituted cyclic, linear, or branched C1-C18 alkyl or alkenyl group, or a C6-C18 aryl group; when W is $—O—R^8—$, a is 1 or 2, b is 0 or 1, c is 1 or 2, and a+b+c=3; when W is not $—O—R^8—$, a is 1 or 2, b is 0 or 1, c is 1 or 2, and a+b+c=3; and each occurrence of $R^1$, $R^2$, X, W, or $R^9$ may be the same or different, the compound (B) being a C1-C20 saturated hydrocarbon having one alkoxysilyl group, a C1-C20 hydrocarbon having two or more alkoxysilyl groups, or a C1-C20 polycarboxylic acid ester.

2. The curable composition according to claim 1, wherein the compound (B) is free of reactive functional groups other than ethoxy groups.

3. The curable composition according to claim 1, wherein $R^1$ in formula (1) is an organic group represented by formula (2):

$$—CR^{10}{}_{3-e}Y_e \quad (2)$$

wherein Y is a group selected from the group consisting of a halogen atom, $—OR^3$, $—NR^4R^5$, $—N{=}R^6$, $—SR^7$, a C1-C20 perfluoroalkyl group, and a cyano group, wherein $R^3$, $R^4$, $R^5$, and $R^7$ are each a hydrogen atom or a C1-C20 monovalent substituted or unsubstituted hydrocarbon group, and $R^6$ is a C1-C20 divalent substituted or unsubstituted hydrocarbon group; $R^{10}$ is a hydrogen atom or a C1-C19 alkyl group; e is 1, 2, or 3; and each occurrence of Y or $R^{10}$ may be the same or different.

4. The curable composition according to claim 3, wherein Y in formula (2) is an alkoxy group.

5. The curable composition according to claim 4, wherein Y in formula (2) is a methoxy group, an ethoxy group, or a phenoxy group.

6. The curable composition according to claim 3, wherein the organic group represented by formula (2) is a methoxymethyl group or an ethoxymethyl group.

7. The curable composition according to claim 1, wherein the organic group represented by formula (1) is $—O—CO—NH—CH_2—SiR^1{}_aR^2{}_bX_c$ wherein $R^1$, $R^2$, a, b, and c are as defined above.

8. The curable composition according to claim 1, wherein X in formula (1) is a dimethoxy group.

9. The curable composition according to claim 1, wherein the organic polymer (A) has a backbone that is a polyoxyalkylene polymer.

10. The curable composition according to claim 9, wherein the organic polymer (A) has a backbone that is a polyoxypropylene polymer.

11. The curable composition according to claim 1, wherein there are no more than 500 ppm of any organotin compound in the composition.

12. The curable composition according to claim 1, further comprising an amidine compound as a silanol condensation catalyst in an amount of 0.001 to 20 parts by weight per 100 parts by weight of the organic polymer (A).

13. The curable composition according to claim 1, wherein the compound (B) is 1,2-bis(triethoxysilyl)-ethane, 1,3-bis(triethoxysilyl)propane, propyltriethoxysilane, n-octyltriethoxysilane, diethyl succinate, diethyl adipate, diethyl sebacate, or diethyl phthalate.

14. The curable composition according to claim 1, wherein the compound (B) has at least one silyl group in its molecule.

15. The curable composition according to claim 1, further comprising an amino group-containing silane coupling agent in an amount of 0.1 to 3.8 parts by weight per 100 parts by weight of the organic polymer (A).

16. A one-pack curable composition, comprising, as a component, the curable composition according to claim 1.

17. A sealant, comprising, as a component, the curable composition according to claim 1.

18. A cured product of the curable composition according to claim 1.

19. The cured product according to claim 18, wherein the cured product has an elongation at break of 380% or higher and an elastic recovery of 65% or higher.

* * * * *